(12) United States Patent
Ejima

(10) Patent No.: US 6,449,596 B1
(45) Date of Patent: Sep. 10, 2002

(54) WIDEBAND AUDIO SIGNAL ENCODING APPARATUS THAT DIVIDES WIDE BAND AUDIO DATA INTO A NUMBER OF SUB-BANDS OF NUMBERS OF BITS FOR QUANTIZATION BASED ON NOISE FLOOR INFORMATION

(75) Inventor: Naoki Ejima, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/125,082

(22) PCT Filed: Feb. 7, 1997

(86) PCT No.: PCT/JP97/00301

§ 371 (c)(1),
(2), (4) Date: Jun. 7, 1999

(87) PCT Pub. No.: WO97/29549

PCT Pub. Date: Aug. 14, 1997

(30) Foreign Application Priority Data

Feb. 8, 1996 (JP) ................................. 8-07263
Mar. 27, 1996 (JP) ............................... 8-022291

(51) Int. Cl.$^7$ ............................................. G10L 21/00
(52) U.S. Cl. ..................................... 704/501; 704/503
(58) Field of Search ................................ 704/500–504

(56) References Cited

U.S. PATENT DOCUMENTS

| | | | |
|---|---|---|---|
| 4,896,362 A | * | 1/1990 | Veldhuis et al. ......... 704/200.1 |
| 4,972,484 A | * | 11/1990 | Theile et al. ............ 704/200.1 |
| 5,151,941 A | * | 9/1992 | Nishiguchi et al. ......... 704/233 |
| 5,440,596 A | * | 8/1995 | Kneepkens et al. ......... 375/240 |
| 5,956,674 A | * | 9/1999 | Smyth et al. ............ 704/200.1 |

FOREIGN PATENT DOCUMENTS

| | | |
|---|---|---|
| GB | 2 252 002 | 7/1992 |
| GB | 2 252 021 | 7/1992 |
| JP | 62-183627 | 8/1987 |

(List continued on next page.)

OTHER PUBLICATIONS

Lin, Nan–Sheng, Bernard Frankel, Gordon Jacobs, and Richard Ulmer, "Sigma–Delta A/D and D/A for High–Speed Voiceband Modems," 1989 Int. Conf on Acoust. Speech and Sig. Proc., 1989 ICASSP–89, May 23–26 1989, vol. 4, pp. 2472–2475.*

(List continued on next page.)

Primary Examiner—Marsha D. Banks-Harold
Assistant Examiner—Donald L. Storm
(74) Attorney, Agent, or Firm—Wenderoth, Lind & Ponack, L.L.P.

(57) ABSTRACT

A wide band audio signal encoding apparatus, a wide band audio signal decoding apparatus, a wide band audio signal encoding and decoding apparatus and a wide band audio signal recording medium, each having a low bit rate, a wide band, a low distortion factor and a wide dynamic range are provided. Wide band audio data is divided into signal data of a predetermined natural number N of sub-bands, and the number of bits for quantization for sub-sampling is determined based on noise floor information of the above wide band audio data. The signal data of the N sub-bands are sub-sampled by the respective numbers of bits for quantization, and encoded data obtained by multiplexing the signal data of the sub-sampled N sub-bands are recorded on a wide band audio signal recording medium. Therefore, both the characteristics of an extremely wide dynamic range and a wide band can be concurrently achieved at a relatively low bit rate per channel. This arrangement allows the achievement of recording and reproduction of an extremely transparent natural sound extending to an ultrahigh frequency region, and a recording medium for recording a signal of the above wide band audio data and a reproduction sound field.

11 Claims, 12 Drawing Sheets

FOREIGN PATENT DOCUMENTS

| | | |
|---|---|---|
| JP | 3-36826 | 2/1991 |
| JP | 4-188914 | 7/1992 |
| JP | 4-343577 | 11/1992 |
| JP | 5-191185 | 7/1993 |
| JP | 5-207287 | 8/1993 |
| JP | 5-313694 | 11/1993 |
| JP | 6-189140 | 7/1994 |
| JP | 6-342558 | 12/1994 |
| JP | 7-22960 | 1/1995 |
| JP | 7-170515 | 7/1995 |
| JP | 8-18459 | 1/1996 |
| JP | 8-32963 | 2/1996 |

OTHER PUBLICATIONS

Hirohiko Kamigadaira, "Manufacturer's Strategy for High–Quality CD at the Next Stage—Development of High– Density Recording Type Optical Disk System", Musen to Jikken (Audio Technology), Seibun–dou–shin–kousha, vol. 82, No. 22, Feb. 1995—with partial English translation.

Makoto Akune et al., "Principle and Operation of SONY Super Bit Mapping which May Change Digital Audio Technique", Radio Gijutsu, Radio–Gijutsu–sha, vol. 45, No. 4, pp. 146–150, Apr. 1, 1991—with partial English translation.

Hidehiro Ishii et al., "The Application of a New High–Density Optical Disc for Audio", Audio Engineering Society, 99th Convention 1995, 4121 (D–9), New York, Oct. 6–9, 1995—with partial English translation.

Tsutomu Oohashi et al., "Physiological and Kansei Scientific Approach—A Study on the Difference of the Sound Quality Between LP Sound and CD Sound", Technical Report of IEICE, pp. 15–22, Jun. 1994—with English Abstract.

Anthony C. Koch et al., "Analysis o Subband Quantization Noise Levels and Shapes: A function of Wideband Audio Codec Tandemming", IEEE ASSP, CCECE/CCGEI 1993, pp. 285–288.

* cited by examiner

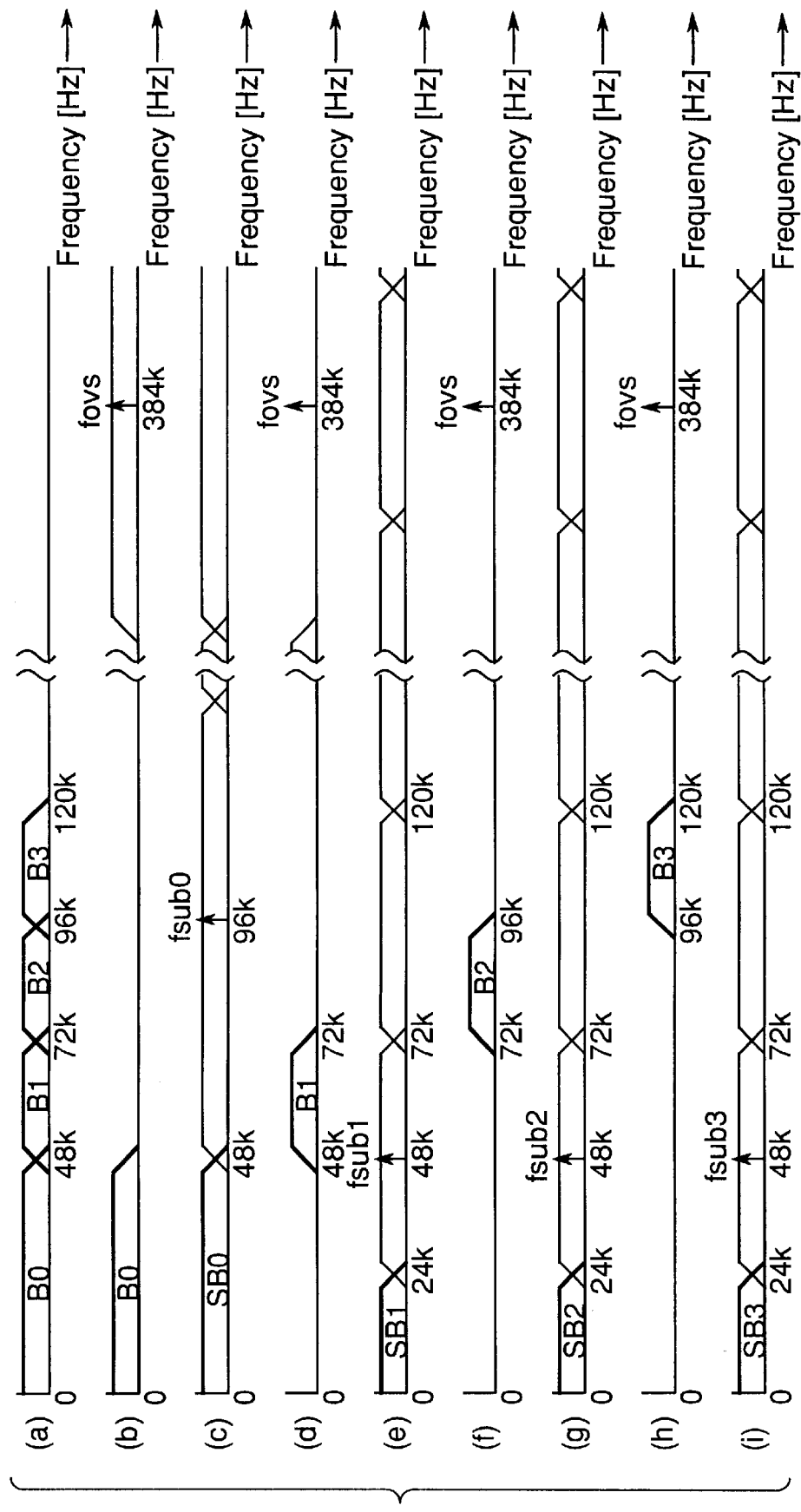

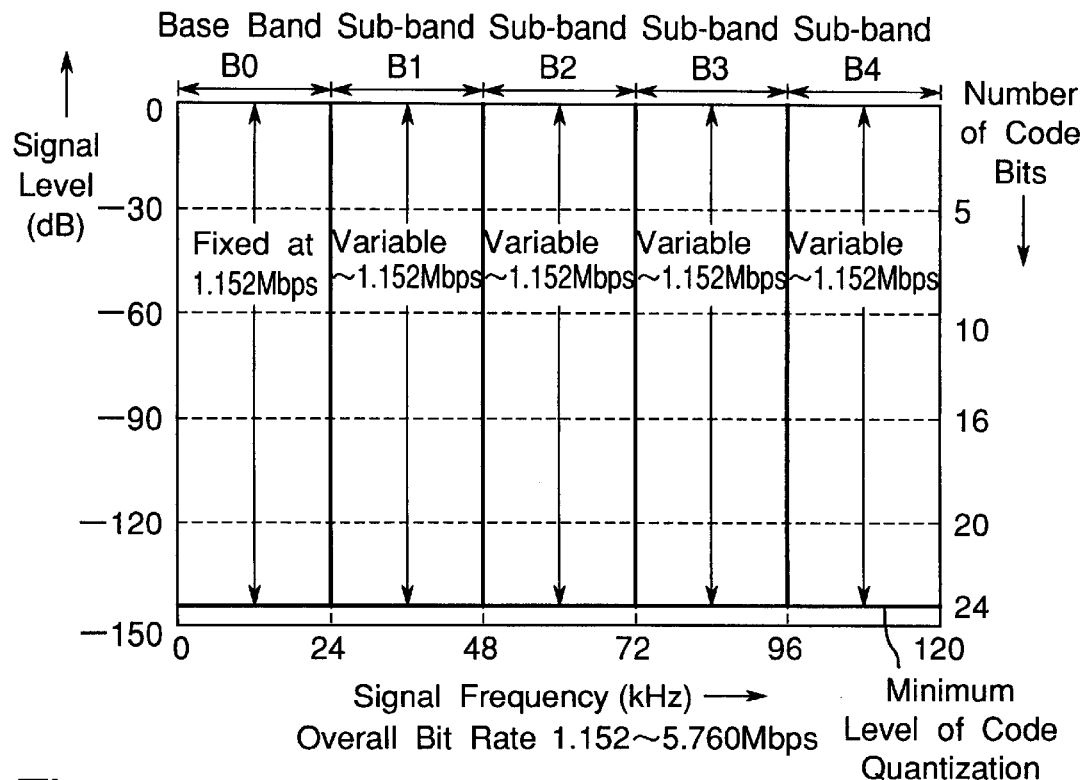
Fig.5 First Preferred Enbodiment of First Operation Mode
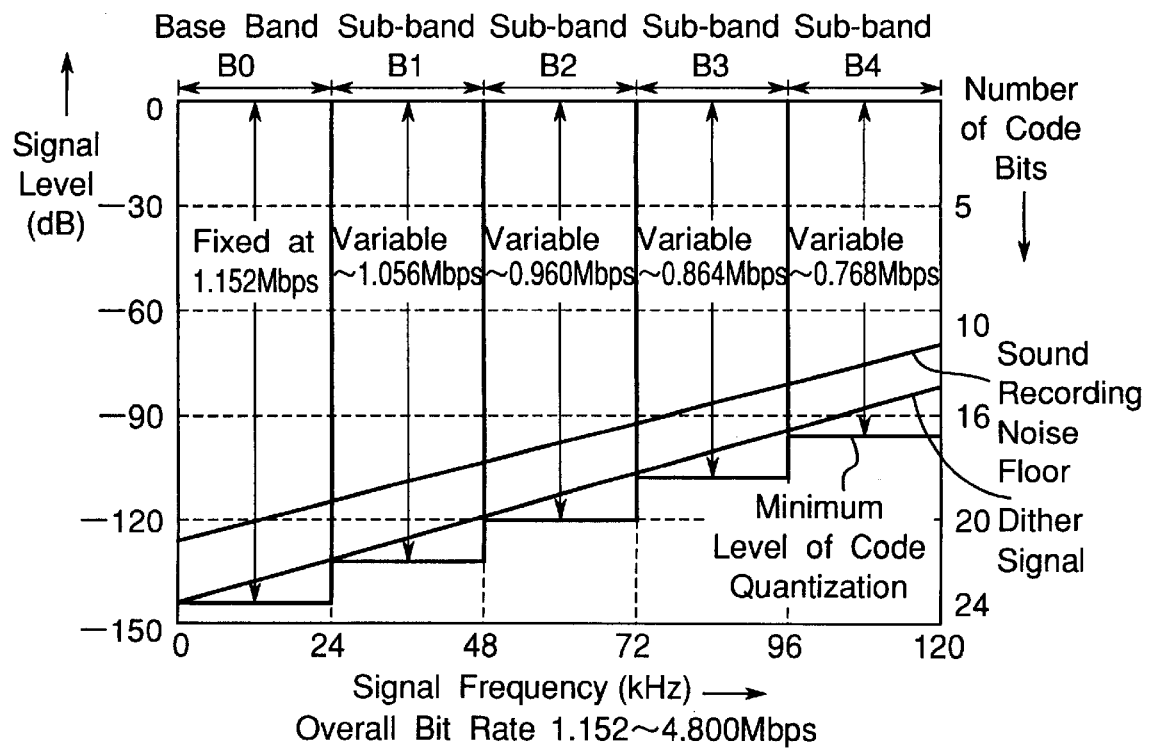
Fig.6 Second Preferred Enbodiment of First Operation Mode

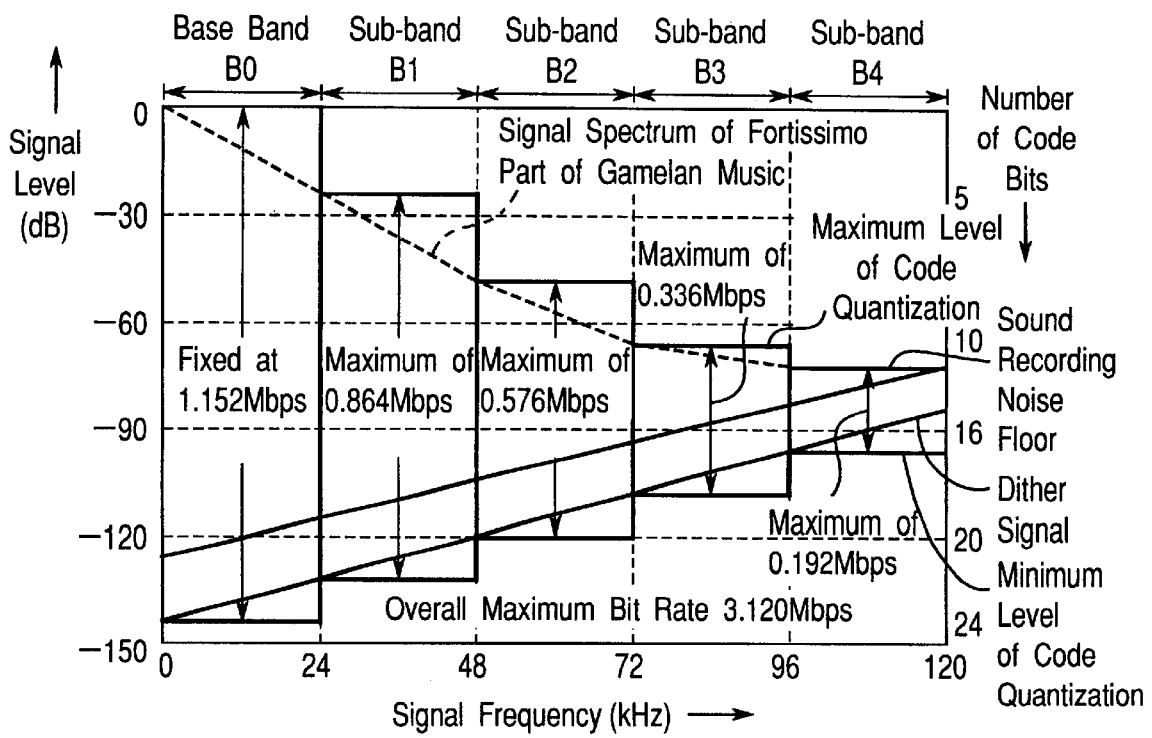
Fig.7 Third Preferred Embodiment of First Operation Mode
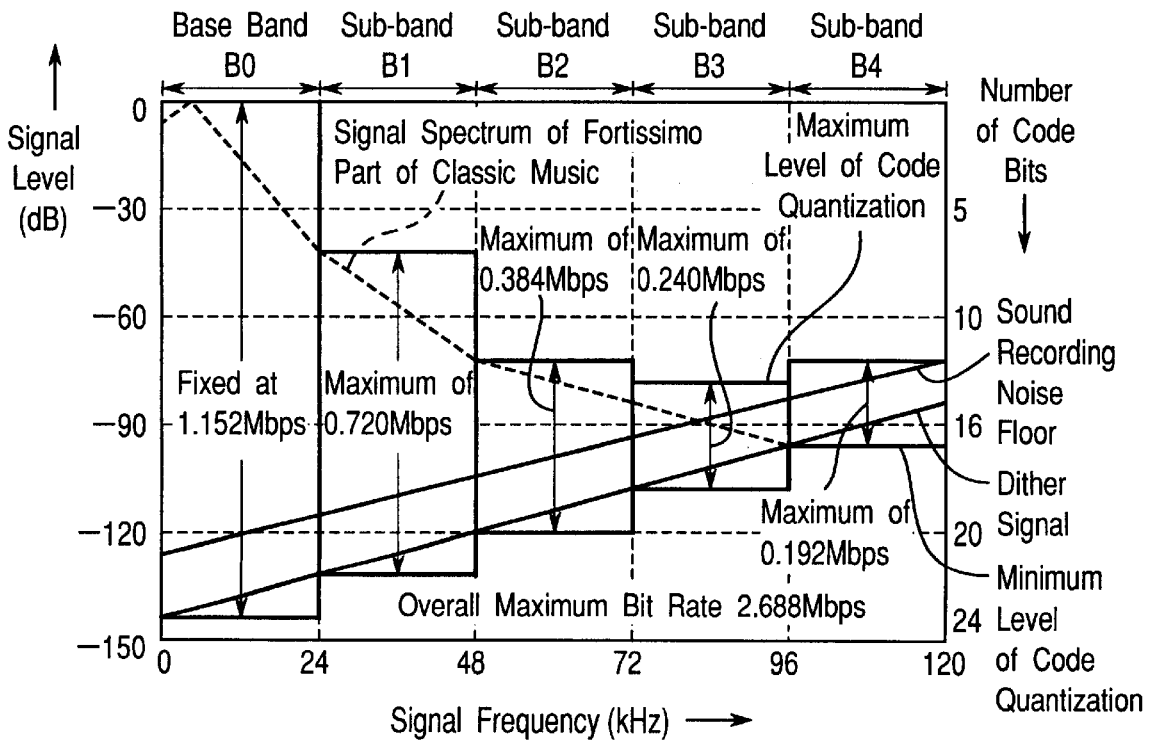
Fig.8 Fourth Preferred Embodiment of First Operation Mode

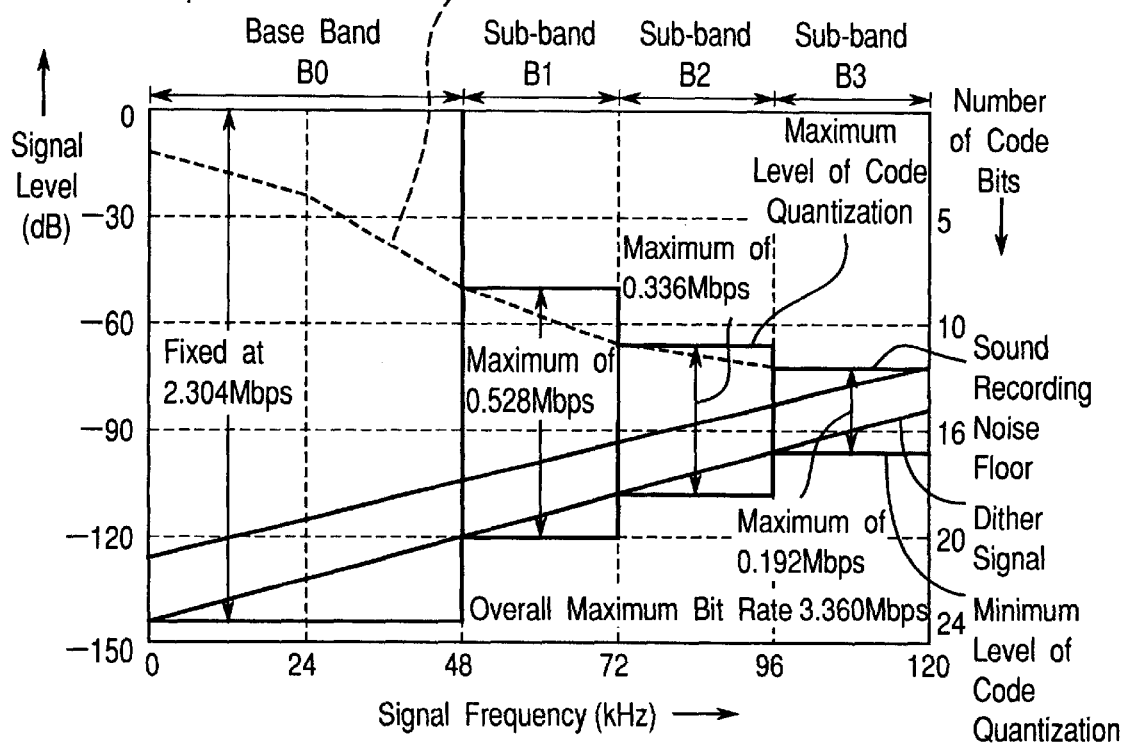
Fig.9 Fifth Preferred Embodiment of Operation Mode
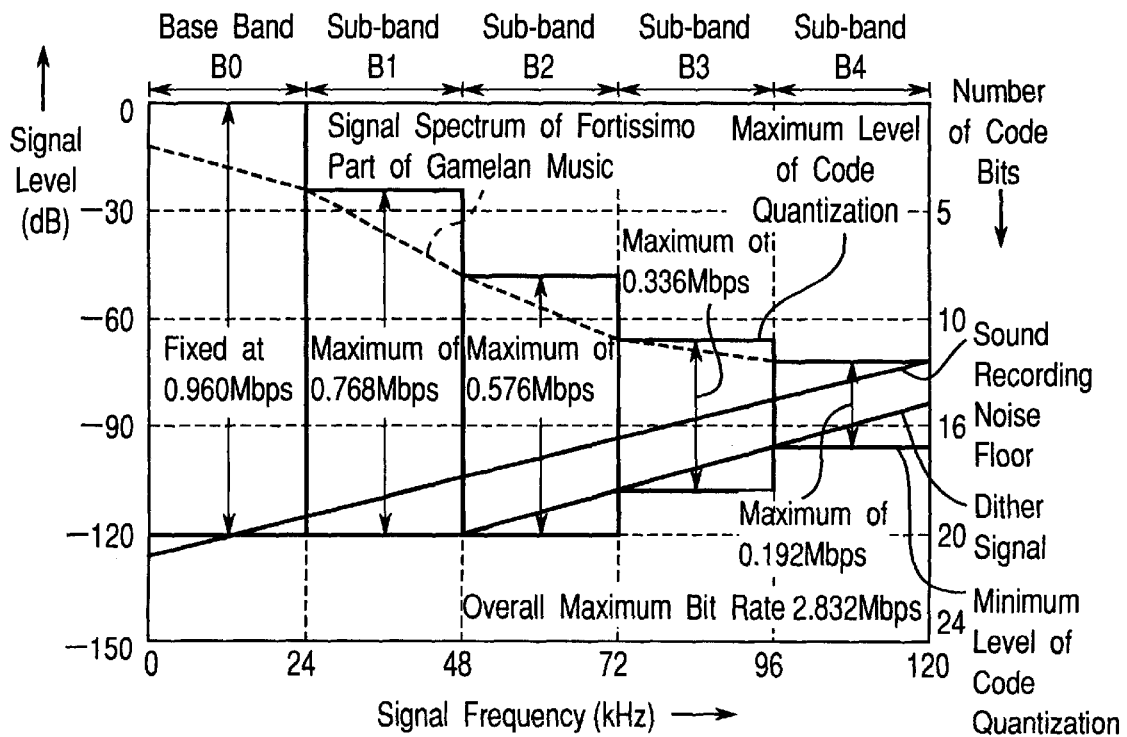
Fig.10 First Preferred Embodiment of Second Operation Mode

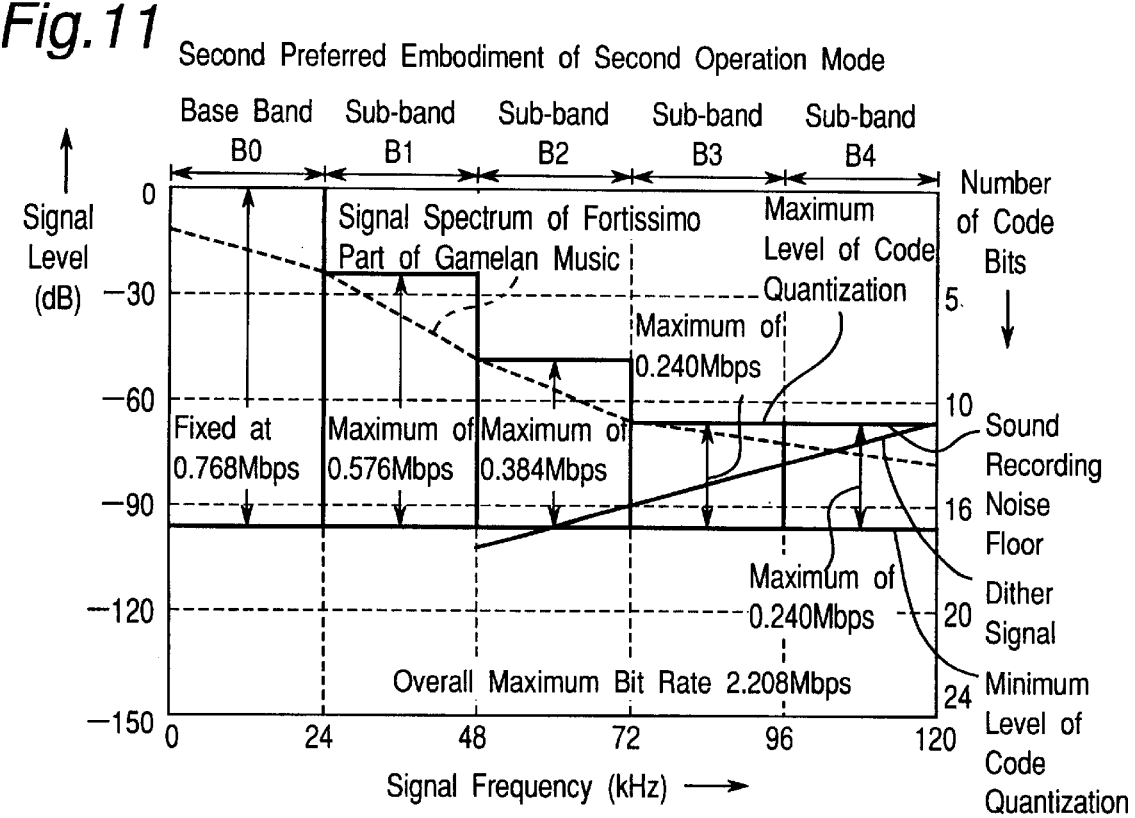
Fig.11 Second Preferred Embodiment of Second Operation Mode
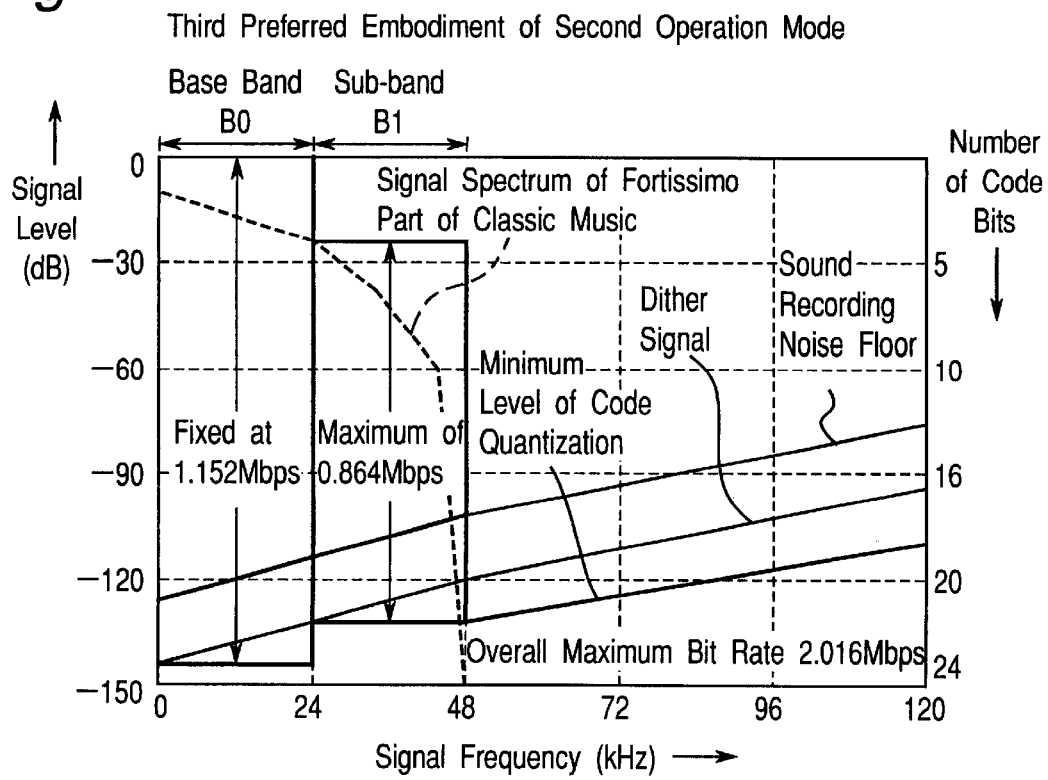
Fig.12 Third Preferred Embodiment of Second Operation Mode

*Fig.15*

| Reproducer<br>Disk | Prior Art AV Disk Reproducer | Optical Disk Reproducer of Present Preferred Embodiment |
|---|---|---|
| Prior Art AV Disk 96kHz/24bits | ◎ | ○<br>Capable of Reproducing Audio Signal |
| Optical Disk of Present Preferred Embodiment 240kHz/24bits | ○<br>Capable of Reproducing Base Band Signal | ◎ |

Fig. 16 Wide Band Audio Signal Encoding Apparatus 1001

WIDEBAND AUDIO SIGNAL ENCODING APPARATUS THAT DIVIDES WIDE BAND AUDIO DATA INTO A NUMBER OF SUB-BANDS OF NUMBERS OF BITS FOR QUANTIZATION BASED ON NOISE FLOOR INFORMATION

TECHNICAL FIELD

The present invention relates to a wide band audio signal encoding apparatus, a wide band audio signal encoding and decoding apparatus, and a wide band audio signal recording medium for transmitting a digital signal with high quality and almost no deterioration.

BACKGROUND ART

Conventionally, recording and reproduction of instrumental and vocal sounds have been widely executed using digital signals of a compact disc (CD), digital data recorder (DAT) and so on. For example, sounds are recorded on the compact disc using a linear coding recording method having a sampling frequency of 44.1 kHz and a number of bits for quantization of 16 bits. According to this method, it is theoretically impossible to reproduce a sound exceeding 22.05 kHz and obtain a dynamic range exceeding 98 dB. That is, although an acoustic signal generated through a live instrumental performance contains a frequency component exceeding 22.05 kHz, it has been considered unnecessary to reproduce these frequency components for the reason that these frequency components are out of the audible band.

However, research has been conducted into the possibility that an ultrahigh frequency sound activates the alpha wave, or a brain wave of the human being, and it has started to be considered that the ultrahigh frequency sound produces some effect on the brain wave. Although it cannot be indiscriminately decided whether or not the ultrahigh frequency sound can be heard by the human being also depending on individual differences, it is pointed out that the ultrahigh frequency sound has some physical and physiological influences and effects and that the ultrahigh frequency sound component in a reproduced signal is important for the purpose of leaving sounds of higher qualities as a cultural inheritance for the future.

Furthermore, with regard to the fact that the actual instrumental sounds have a dynamic range that exceeds 100 dB and sometimes reaches 130 dB, it is pointed that there is a shortage of dynamic range due to the fact that a clipping distortion tends to occur when the sounds are expressed by 16 bits in quantization and the fact that a distortion due to a quantization error, particularly in a region where the signal is small, causes a sound impurity.

In view of the above, there has been proposed a first prior art method, as disclosed in a first prior art reference, "Hirohiko Kamigahira, "Manufacturer's Strategies for the Next-Generation High-quality CD", Musen to Jikken, published by Seibundou Shinkousha, Vol. 82, No. 2, pp. 100–107, February, 1995", in which the least significant bit LSB of 16-bit data is used and music signal information not lower than 22.05 kHz is recorded by ADPCM (Adaptive Differential Pulse Code Modulation) in this least significant bit LSB. There has also been proposed a second prior art method, as disclosed in a second prior art reference, "Makoto Akune et al., "Theory and Operation of Super Bit Mapping", published by Radio Gijutsu, Radio Gijutsusha, Vol. 1, 45, No. 4, pp. 146–150, April, 1991", in which the quantization noise is moved into a frequency range of 15 kHz to 22.05 kHz by a noise shaping process, thereby improving the dynamic range in terms of auditory sensation.

As a next-generation format, there is a SD (Super Density Disk) format studied as a fundamental technique of DVD (Digital Video Disk or Digital Versatile Disk) as a consequence of the recent development of the practicability of a high-density recording disk. In regard to the audio section of the SD format, the summary thereof is announced in a third prior art reference, "Hidehiro Ishii et al., "The Application of a New High-Density Optical Disc for Audio", Proceedings of The 99th Convention of an Audio Engineering Society, 4121(D-9), New York, Oct. 6–9, 1995", which discloses a linear PCM system with a sampling frequency of 48 kHz and 16 bits for quantization, as well as the specifications of the proposed SD format that remarkably exceeds the specifications of the prior art CD as exemplified by a linear PCM system with a sampling frequency of 96 kHz and 24 bits for quantization. This proposed format provides the prospects for the achievement of a reproduction frequency band of about 45 kHz and a dynamic range of 140 dB.

However, as disclosed in the recent research paper, as a fourth prior art reference, "Tsutomu OOhashi et al., "A study on the difference of the sound quality between LP sound and CD sound—Physiological and KANSEI(Sensory) Scientific Approach", Technical Report of The Institute of Electronics, Information and Communication Engineers, HC94-06, pp. 15–22, June, 1994", it is confirmed that a signal that exceeds 50 kHz and reaches 100 kHz is recorded in a reproducible state on the LP (Long-Playing) record, and particularly in a fortissimo part of the ethnic instrument of a gamelan, a spectrum that exceeds 50 kHz and reaches 100 kHz is observed.

From this result of research, it cannot help but be said that even the band of about 45 kHz of the proposed SD format is still insufficient for faithfully reproducing such music. The reproduction band is also extended beyond 100 kHz if the sampling frequency of the SD format is further increased to, for example, 240 kHz. However, the amount of information necessary for it is 5.76 Mbps per channel, and this amounts to a vast amount of information of 11.52 Mbps in a 2-channel stereo system. This has consequently led to the problem that the sound can be recorded for up to only about 50 minutes even when DVD having a recording capacity of 4.7 gigabytes is used and it exceeds the upper limit of 6.75 Mbps of the bit rate temporary allocation, resulting in an impracticability.

A first object of the present invention is to solve the above-mentioned problems and to provide a wide band audio signal encoding apparatus capable of encoding an audio signal in a wider band with a higher dynamic range as compared with those of the prior art.

A second object of the present invention is to provide a wide band audio signal decoding apparatus capable of decoding an audio signal in a wider band with a larger dynamic range as compared with those of the prior art.

A third object of the present invention is to provide a wide band audio signal encoding and decoding apparatus capable of encoding and decoding an audio signal in a wider band with a larger dynamic range as compared with those of the prior art.

A fourth object of the present invention is to provide a wide band audio recording medium capable of recording an audio signal in a wider band with a larger dynamic range as compared with those of the prior art.

SUMMARY OF THE INVENTION

In order to achieve the above-mentioned objective, according to a first aspect of the present invention, there is provided a wide band audio signal encoding apparatus comprising a sub-band dividing filter for dividing inputted wide band audio data into signal data of a predetermined natural number N of sub-bands, and outputting the resulting data, N sub-sampling means for sub-sampling the signal data of the N sub-bands outputted from the sub-band dividing filter with respective predetermined numbers of bits for quantization, respectively, and outputting the resulting data, encoding system controlling means for determining the numbers of bits for quantization of said N sub-sampling means based on inputted noise floor information and setting the determined numbers of bits for quantization to the respective N sub-sampling means, respectively, and a multiplexer for multiplexing the signal data of the N sub-bands outputted from the N sub-sampling means, and outputting the multiplexed encoded data.

Also, according to a second aspect of the present invention, there is provided a wide band audio signal encoding apparatus comprising encoding system controlling means for determining a bandwidth of division and a number N of division of bands of the wide band audio data based on inputted signal information including signal band information of inputted wide band audio data, a sub-band dividing filter for dividing the wide band audio data into signal data of a predetermined natural number N of sub-bands having the bandwidth of division and the number N of division which are determined by the encoding system controlling means, and outputting the resulting data, N sub-sampling means for sub-sampling the signal data of the N sub-bands outputted from the sub-band dividing filter, respectively, and outputting the resulting data, N redundancy compressing means for determining a scale factor by detecting a signal data peak level within a predetermined time period of the signal data of at least one sub-band among the N sub-bands outputted from the N sub-sampling means, executing an eliminating process for eliminating a high-order redundant run length from the signal data of the N sub-bands based on the determined scale factor, and outputting the processed signal data of the N sub-bands, and a multiplexer for multiplexing the scale factor determined by the redundancy compressing means with the signal data of the N sub-bands outputted from the N redundancy compressing means, and outputting the multiplexed encoded data.

Further, according to a third aspect of the present invention, there is provided a wide band audio signal encoding apparatus comprising encoding system controlling means for determining a bandwidth of division and a number N of division of bands of the wide band audio data based on inputted signal information including noise floor information and signal band information of inputted wide band audio data, and determining the number of bits for quantization in the predetermined natural number N of sub-sampling means based on the noise floor information, respectively, a sub-band dividing filter for dividing the wide band audio data into signal data of N sub-bands having the width of division and the number N of division which are determined by the encoding system controlling means, and outputting the resulting data, N sub-sampling means for sub-sampling the signal data of the N sub-bands outputted from the sub-band dividing filter with the number of bits for quantization determined by the encoding system controlling means, respectively, and outputting the resulting data, and a multiplexer for multiplexing the signal data of the N sub-bands outputted from the N sub-sampling means with the signal information, and outputting the multiplexed encoded data.

In the above-mentioned wide band audio signal encoding apparatus, preferably, a bandwidth of a base band being the lowest band of the N sub-bands is set to one bandwidth of 10 kHz to 48 kHz. Also, in the above-mentioned wide band audio signal encoding apparatus, preferably, a sub-sampling frequency of a base band being the lowest band of the N sub-bands is set to approximately 32 kHz, 44.1 kHz, 48 kHz, 88.2 kHz or 96 kHz.

Further, in the above-mentioned wide band audio signal encoding apparatus, preferably, a sub-sampling frequency of the N sub-sampling means is set to approximately 32 kHz, 44.1 kHz, 48 kHz, 88.2 kHz or 96 kHz.

Furthermore, in the above-mentioned wide band audio signal encoding apparatus, preferably, a sub-sampling frequency of a base band being the lowest band of the N sub-bands is set to be equal to sub-sampling frequencies of the other bands. Also, in the above-mentioned wide band audio signal encoding apparatus, preferably, the scale factors of the N redundancy compressing means are each fixed at least in a unit of program of a signal to be recorded.

In the above-mentioned wide band audio signal encoding apparatus, preferably, the signal data of a base band being the lowest band of the N sub-bands is not subjected to a high-order redundant run length eliminating process executed by the redundancy compressing means but encoded by a linear coding PCM system having one number of bits for quantization in a range of 16 bits to 24 bits.

Furthermore, in the above-mentioned wide band audio signal encoding apparatus, the noise floor information preferably includes at least one of following information relevant to a background noise of a recording studio and noise characteristics of a sound recording microphone and a microphone amplifier, information relevant to a sampling frequency and a word length of the inputted wide band audio data, and information relevant to noise characteristics of at least one audio apparatus selected from a mixing console and an effector, when the audio apparatus is used.

Also, in the above-mentioned wide band audio signal encoding apparatus, preferably, the encoding system controlling means determines the number of bits for quantization of each sub-band so that a level, which is a predetermined decibel value lower than a decibel value of the noise floor determined based on the inputted wide band audio data, is set as a minimum level of code quantization in each sub-band.

The above-mentioned wide band audio signal encoding apparatus preferably further comprises an encoding dither signal generator for generating a dither signal having a minute level for reducing an interference between a quantization noise in recording sound and a quantization noise in encoding by dispersing the interference, and adding the dither signal to the inputted wide band audio data. Furthermore, in the above-mentioned wide band audio signal encoding apparatus, preferably, the base band and at least one sub-band are allocated so as to correspond to respective channels of multi-channel of a further apparatus. Also, the above-mentioned wide band audio signal encoding apparatus preferably further comprises a linear predictive encoder for reducing a peak spectrum in a low-frequency region by executing a linear predictive encoding process on the signal data of at least one sub-band among the signal data of the N sub-bands outputted from the N sub-sampling means.

Further, in the above-mentioned wide band audio signal encoding apparatus, preferably, a discrimination signal representing the fact that the linear predictive encoding process has been executed by said linear predictive encoder on the signal data of a predetermined sub-band is attached to the encoded data by multiplexing the discrimination signal with the encoded data.

According to a fourth aspect of the present invention, there is provided a wide band audio signal recording medium, wherein wide band audio data is divided into signal data of a predetermined natural number N of sub-bands, the number of bits for quantization for subsampling is determined based on noise floor information of the wide band audio data, the signal data of the N sub-bands are each sub-sampled by the determined number of bits for quantization, and encoded data obtained by multiplexing the signal data of the sub-sampled N sub-bands is recorded on the wide band audio signal recording medium.

Also, according to a fifth aspect of the present invention, there is provided a wide band audio signal recording medium, wherein a bandwidth of division and a number of division of bands of inputted wide band audio data are determined based on signal band information of the wide band audio data, the inputted wide band audio data is divided into signal data of a predetermined natural number N of sub-bands, a scale factor for redundancy compressing is determined by detecting a signal peak level within a predetermined time period of at least one piece of signal data among the signal data of the N sub-bands, the signal data of the sub-sampled N sub-bands are converted into encoded data through exclusion of a high-order redundant run length by the redundancy compressing means based on the determined scale factor, and encoded data obtained by multiplexing the scale factor with the encoded data outputted from the redundancy compressing means is recorded on the wide band audio signal recording medium.

Further, according to a sixth aspect of the present invention, there is provided a wide band audio signal recording medium, wherein a bandwidth of division and a number of division of bands of inputted wide band audio data are determined based on signal information of the wide band audio data, a number of bits for quantization in a natural number N of sub-sampling means is determined based on noise floor information of the inputted wide band audio data, the wide band audio data is divided into signal data of the N sub-bands having the determined width of division and the number N of division, the signal data of the divided N sub-bands are sub-sampled by the determined number of bits for quantization, and encoded data obtained by multiplexing the signal data of the sub-sampled N sub-bands with the signal information is recorded on the wide band audio signal recording medium.

According to a seventh aspect of the present invention, there is provided a wide band audio signal decoding apparatus comprising a demultiplexer for demultiplexing signal data of a natural number N of sub-bands and noise floor information from inputted encoded data N redundancy decompressing means for decompressing signal data of the N sub-bands, respectively, by executing a redundancy decompression process on the signal data of the N sub-bands based on the noise floor information, and outputting the resulting data, N over-sampling means for executing an over-sampling process on the signal data of N sub-bands outputted from the N redundancy decompressing means, respectively, and outputting the processed signal data of the N sub-bands, and a sub-band combining filter for combining the signal data of the N sub-bands outputted from the N over-sampling means, and outputting the combined wide band audio data.

Also, according to an eighth aspect of the present invention, there is provided a wide band audio signal decoding apparatus comprising a demultiplexer for demultiplexing signal data of a natural number N of sub-bands and signal information including signal band information of each sub-band and a scale factor of each sub-band from inputted encoded data, N redundancy decompressing means for decompressing signal data of the N sub-bands, respectively, by executing a redundancy decompression process on the signal data of the N sub-bands demultiplexed by the demultiplexer based on the scale factor of each sub-band within a predetermined time interval, and outputting the resulting data, N over-sampling means for determining an over-sampling frequency of each of the N over-sampling means based on the signal band information, executing an over-sampling process on the signal data of the N sub-bands outputted from the N redundancy decompressing means at the determined over-sampling frequencies, respectively, and outputting the processed signal data of the N sub-bands, and a sub-band combining filter for combining the signal data of the N sub-bands outputted from the N over-sampling means, and outputting the combined wide band audio data.

Further, according to a ninth aspect of the present invention, there is provided a wide band audio signal decoding apparatus comprises a demultiplexer for demultiplexing signal data of a natural number N of sub-bands and signal information including a scale factor of each sub-band, signal band information and time code additional information from inputted encoded data N redundancy decompressing means for decompressing signal data of the N sub-bands, respectively, by executing a redundancy decompression process on the signal data of the N sub-bands demultiplexed by the demultiplexer based on the scale factor of each sub-band within a predetermined time interval, and outputting the resulting data, N over-sampling means for determining an over-sampling frequency of each of the N over-sampling means based on the signal band information, executing an over-sampling process on the signal data of the N sub-bands outputted from the N redundancy decompression means at predetermined over-sampling frequencies, respectively, and outputting the processed signal data of the N sub-bands, and a sub-band combining filter for combining the signal data of the N sub-bands outputted from the N over-sampling means, and outputting the combined wide band audio data.

In the above-mentioned wide band audio signal decoding apparatus, preferably, a bandwidth of a base band being the lowest band out of the N sub-bands is set to one bandwidth of 10 kHz to 48 kHz so as to be equal to a bandwidth of a predetermined digital audio system.

Also, in the above-mentioned wide band audio signal decoding apparatus, preferably, a sub-sampling frequency of the base band is set to 32 kHz, 44.1 kHz, 48 kHz, 88.2 kHz or 96 kHz.

Further, in the above-mentioned wide band audio signal decoding apparatus, preferably, the signal data of the base band is not subjected to a high-order redundant run length redundancy compressing process by the redundancy compressing means and the encoded data is encoded by a linear PCM coding system having one number of bits for quantization in a range of 16 bits to 24 bits.

Furthermore, the above-mentioned wide band audio signal decoding apparatus preferably further comprises decoding system controlling means for controlling the sub-band redundancy decompressing means and the over-sampling means to stop unnecessary operations of the sub-band redundancy decompressing means and the over-sampling means based on inputted information including a highest signal band and a sampling frequency of a reproducing apparatus connected to a subsequent stage of the wide band audio signal decoding apparatus.

Also, in the above-mentioned wide band audio signal decoding apparatus preferably further comprises decoding system controlling means for determining the number of bits for quantization in the redundancy decompressing means and the over-sampling means based on inputted specification information of a noise floor of a reproducing apparatus connected to a subsequent stage of the wide band audio signal decoding apparatus, and executing a rounding-off process on the low-order bits when a word length of the wide band audio data included in the inputted encoded data is so great that a surplus of low-order bits exists.

Further, in the above-mentioned wide band audio signal decoding apparatus, preferably, the decoding system controlling means discriminates a discrimination signal relevant to the linear predictive encoding process included in the additional information included in the inputted encoded data. The wide band audio signal decoding apparatus further comprises a linear predictive decoder for executing a linear predictive decoding process on the signal data of the N sub-bands outputted from the N sub-sampling means when the discrimination signal represents the fact that the linear predictive encoding process has been executed on the encoded data, and outputting the processed signal data of the N sub-bands.

Furthermore, in the above-mentioned wide band audio signal decoding apparatus, preferably, the discrimination signal includes a discrimination signal representing the fact that the linear predictive encoding process has been executed by the linear predictive encoder on at least one of the signal data of the N sub-bands.

According to a tenth aspect of the present invention, there is provided a wide band audio signal encoding and decoding apparatus comprising a wide band audio signal encoding apparatus, and a wide band audio signal decoding apparatus. The wide band audio signal encoding apparatus comprises a sub-band dividing filter for dividing inputted wide band audio data into signal data of a predetermined natural number N of sub-bands having a bandwidth of division and a number N of division determined based on inputted signal information including signal band information of the wide band audio data, and outputting the resulting data, N sub-sampling means for sub-sampling the signal data of the N sub-bands outputted from the sub-band dividing filter, respectively, and outputting the resulting data, N redundancy compressing means for determining a scale factor by detecting a signal data peak level within a predetermined time period of the signal data of at least one sub-band among the N sub-bands outputted from the N sub-sampling means, executing an eliminating process for eliminating a high-order redundant run length from the signal data of the N sub-bands based on the determined scale factor, and outputting the processed signal data of the N sub-bands, and a multiplexer for multiplexing the scale factor determined by the redundancy compressing means with the signal data of the N sub-bands outputted from the N redundancy compressing means, and outputting the multiplexed encoded data.

The wide band audio signal decoding apparatus comprises a demultiplexer for demultiplexing signal data of a natural number N of sub-bands and noise floor information from the multiplexed encoded data N redundancy decompressing means for decompressing signal data of the N sub-bands, respectively, by executing a redundancy decompression process on the signal data of the N sub-bands based on the noise floor information, and outputting the resulting data, N over-sampling means for executing an over-sampling process on the signal data of the N sub-bands outputted from the N redundancy decompressing means, respectively, and outputting the processed signal data of the N sub-bands, and a sub-band combining filter for combining the signal data of the N sub-bands outputted from the N over-sampling means, and outputting the combined wide band audio data.

Also, according to an eleventh aspect of the present invention, there is provided a wide band audio signal encoding apparatus comprising a sub-band dividing filter for dividing inputted wide band audio data into signal data of a predetermined natural number N of sub-bands having a predetermined bandwidth of division and a number N of division, and outputting the resulting data, N sub-sampling means for sub-sampling the signal data of the N sub-bands outputted from the sub-band dividing filter, respectively, and outputting the resulting data, redundancy compressing means for compressing signal data by executing a predetermined reversible redundancy compressing process on the signal data of at least one sub-band among the signal data of the N sub-bands outputted from the N sub-sampling means, and outputting the processed signal data, and a multiplexer for multiplexing the signal data of the N sub-bands outputted from the sub-sampling means and the redundancy compressing means, and outputting the multiplexed encoded data.

Further, according to a twelfth aspect of the present invention, there is provided a wide band audio signal encoding apparatus comprising encoding system controlling means for determining a bandwidth of division and a number N of division of bands of the wide band audio data based on inputted signal information including noise floor information and signal band information of inputted wide band audio data, and determining the number of bits for quantization of a predetermined natural number N of sub-sampling means based on the noise floor information, respectively, a sub-band dividing filter for dividing the wide band audio data into signal data of N sub-bands having the width of division and the number N of division which are determined by the encoding system controlling means, and outputting the resulting data, N sub-sampling means for sub-sampling the signal data of the N sub-bands outputted from the sub-band dividing filter with the number of bits for quantization determined by the encoding system controlling means, respectively, and outputting the resulting data, N redundancy compressing means for compressing signal data by executing a predetermined reversible redundancy compressing process on the signal data of the N sub-bands outputted from the N sub-sampling means, and outputting the processed signal data, and a multiplexer for multiplexing the signal data of the N sub-bands outputted from the N redundancy compressing means and the signal information, and outputting the multiplexed encoded data.

Furthermore, according to a thirteenth aspect of the present invention, there is provided a wide band audio signal encoding apparatus comprising a sub-band dividing filter for dividing inputted wide band audio data into signal data of a predetermined natural number N of sub-bands having a predetermined bandwidth of division and a number N of division, and outputting the resulting data, N sub-sampling means for sub-sampling the signal data of the N sub-bands outputted from the sub-band dividing filter, respectively, and outputting the resulting data, a redundancy compressing means for executing a predetermined reversible $\Delta$-$\Sigma$ modulating process on the signal data of at least one sub-band among the signal data of the N sub-bands outputted from the N sub-sampling means, and outputting the processed signal data, and a multiplexer for multiplexing the signal data of the N sub-bands outputted from the sub-sampling means and the redundancy compressing means, and outputting the multiplexed encoded data.

In the above-mentioned wide band audio signal encoding apparatus, preferably, the redundancy compressing means comprises at least one of a linear predictive encoder and an entropy encoder. Also, in the above-mentioned wide band audio signal encoding apparatus, preferably, the redundancy compressing means comprises at least one of a linear predictive encoder and an entropy encoder, wherein the multiplexer multiplexes a discrimination signal representing the fact that the redundancy compressing process has been executed with the multiplexed encoded data.

In the above-mentioned wide band audio signal encoding apparatus, preferably, the bandwidth of the base band being the lowest band of the N sub-bands is set to one bandwidth of 10 kHz to 48 kHz. Furthermore, in the above-mentioned wide band audio signal encoding apparatus, preferably, a sub-sampling frequency of a base band being the lowest band of the N sub-bands is set to approximately 32 kHz, 44.1 kHz, 48 kHz, 88.2 kHz or 96 kHz.

Also, in the above-mentioned wide band audio signal encoding apparatus, preferably, a sub-sampling frequency of each of said N sub-sampling means is set to approximately 32 kHz, 44.1 kHz, 48 kHz, 88.2 kHz or 96 kHz. Further, in the above-mentioned wide band audio signal encoding apparatus, preferably, a sub-sampling frequency of the base band being the lowest band of the N sub-bands is set to be equal to sub-sampling frequencies of the other sub-bands.

Furthermore, in the above-mentioned wide band audio signal encoding apparatus, preferably, the signal data of the base band being the lowest band of the N sub-bands is not subjected to a high-order redundant run length eliminating process executed by the redundancy compressing means but encoded by a linear coding PCM system having one number of bits for quantization in a range of 16 bits to 24 bits.

Also, in the above-mentioned wide band audio signal encoding apparatus, preferably, the noise floor information includes at least one of the following information relevant to a background noise of a recording studio and noise characteristics of a sound recording microphone and a microphone amplifier, information relevant to a sampling frequency and a word length of the inputted wide band audio data, and information relevant to noise characteristics of at least one audio apparatus selected from a mixing console and an effector, when the audio apparatus is used.

In the above-mentioned wide band audio signal encoding apparatus, preferably, the encoding system controlling means determines the number of bits for quantization of each sub-band so that a level, which is a predetermined decibel value lower than a decibel value of the noise floor determined based on the inputted wide band audio data, is set as a minimum level of code quantization in each sub-band.

Furthermore, the above-mentioned wide band audio signal encoding apparatus preferably further comprises an encoding dither signal generator for generating a dither signal having a minute level for reducing an interference between a quantization noise in recording sound and a quantization noise in encoding by dispersing the interference, and adding the dither signal to the inputted wide band audio data. Also, in the above-mentioned wide band audio signal encoding apparatus, preferably, the base band and the sub-bands are allocated to respective independent channels.

Further, in the above-mentioned wide band audio signal encoding apparatus, preferably, the independent channel to which the signal data of the base band is allocated is set to a main channel.

According to a fourteenth aspect of the present invention, there is provided a wide band audio signal recording medium, wherein wide band audio data is divided into signal data of a predetermined natural number N of sub-bands, the signal data of the N sub-bands are each sub-sampled, a reversible data compressing process is executed on the signal data of the sub-sampled N sub-bands, and encoded data obtained by multiplexing the processed signal data of the N sub-bands is recorded on the wide band audio signal recording medium.

According to the fifteenth aspect of the present invention, there is provided a wide band audio signal recording medium, wherein a bandwidth of division and a number N of division of bands of inputted wide band audio data are determined based on the signal band information of the wide band audio data, the inputted wide band audio data is divided into signal data of a predetermined natural number N of sub-bands and sub-sampled, a reversible data compressing process is executed on at least one piece of signal data among the signal data of the N sub-bands, and encoded data obtained by multiplexing the signal data of the N sub-bands including the processed signal data is recorded on the wide band audio signal recording medium.

Further, according to a sixteenth aspect of the present invention, there is provided a wide band audio signal recording medium, wherein wide band audio data is divided into signal data of a predetermined natural number N of sub-bands, the signal data of the N sub-bands are each sub-sampled, a $\Delta$-$\Sigma$ modulating process is executed on the signal data of the sub-sampled N sub-bands, and encoded data obtained by multiplexing the processed signal data of the N sub-bands is recorded on the wide band audio signal recording medium.

In the above-mentioned wide band audio signal recording medium, preferably, the data compressing process is executed by at least one of a linear predictive encoder and an entropy encoder.

According to a seventeenth aspect of the present invention, there is provided a wide band audio signal decoding apparatus comprising a demultiplexer for demultiplexing signal data of a natural number N of sub-bands from inputted encoded data, N redundancy decompressing means for decompressing the signal data of the N sub-bands, respectively, by executing a redundancy decompression process on the signal data of the N sub-bands demultiplexed by said demultiplexer, N over-sampling means for executing an over-sampling process on the signal data of the N sub-bands outputted from the N redundancy decompressing means, respectively, and outputting the processed signal data of the N sub-bands, and a sub-band combining filter for combining the signal data of N sub-bands outputted from the N over-sampling means, and outputting the combined wide band audio data.

Also, according to an eighteenth aspect of the present invention, there is provided a wide band audio signal decoding apparatus comprising a demultiplexer for demultiplexing signal data of a natural number N of sub-bands and signal information including a scale factor and signal band information of each sub-band from inputted encoded data N redundancy decompressing means for decompressing the signal data of the N sub-bands, respectively, by executing a redundancy decompression process on the signal data of the N sub-bands demultiplexed by the demultiplexer based on the scale factor of each sub-band within a predetermined time interval, and outputting the resulting data, N over-sampling means for determining an over-sampling frequency of each of the N over-sampling means based on the signal band information, executing an over-sampling process on the signal data of the N sub-bands outputted from the N redundancy decompressing means at predetermined over-sampling frequencies, respectively, and outputting the processed signal data of the N sub-bands, and a sub-band combining filter for combining the signal data of the N sub-bands outputted from the N over-sampling means, and outputting combined wide band audio data.

Further, according to a nineteenth aspect of the present invention, there is provided a wide band audio signal decoding apparatus comprising a demultiplexer for demultiplexing signal data of a natural number N of sub-bands from inputted encoded data, N redundancy decompressing means for decompressing the signal data of the N sub-bands, respectively, by executing a $\Delta$-$\Sigma$ modulating process on the signal data of the N sub-bands demultiplexed by the demultiplexer, N over-sampling means for executing an over-sampling process on the signal data of the N sub-bands outputted from the N redundancy decompressing means, respectively, and outputting the processed signal data of the N sub-bands, and a sub-band combining filter for combining the signal data of the N sub-bands outputted from the N over-sampling means, and outputting combined wide band audio data.

In the above-mentioned wide band audio signal decoding apparatus, preferably, the N redundancy compressing means comprises at least one of a linear predictive decoder and an entropy decoder.

Also, in the above-mentioned wide band audio signal decoding apparatus, preferably, the bandwidth of the base band being the lowest band of the N sub-bands is set to one bandwidth of 10 kHz to 48 kHz.

In the above-mentioned wide band audio signal decoding apparatus, preferably, a sub-sampling frequency of the base band is set to 32 kHz, 44.1 kHz, 48 kHz, 88.2 kHz or 96 kHz. Furthermore, in the above-mentioned wide band audio signal decoding apparatus, preferably, the signal data of the base band is not subjected to a high-order redundant run length redundancy compressing process by the redundancy compressing means, and the encoded data is encoded by a linear PCM coding system having one number of bits for quantization in a range of 16 bits to 24 bits.

Also, the above-mentioned wide band audio signal decoding apparatus preferably further comprises decoding system controlling means for controlling the sub-band redundancy decompressing means and the over-sampling means to stop unnecessary operations of the sub-band redundancy decompressing means and the over-sampling means based on inputted information including a highest signal band and a sampling frequency of a reproducing apparatus connected to a subsequent stage of the wide band audio signal decoding apparatus.

Further, the above-mentioned wide band audio signal decoding apparatus preferably further comprises decoding system controlling means for determining the number of bits for quantization in the redundancy decompressing means and the over-sampling means based on inputted specification information of a noise floor of a reproducing apparatus connected to a subsequent stage of the wide band audio signal decoding apparatus.

Furthermore, in the above-mentioned wide band audio signal decoding apparatus, preferably, the decoding system controlling means discriminates the discrimination signal relevant to the linear predictive encoding process included in the additional information included in the inputted encoded data. The wide band audio signal decoding apparatus further comprises a decoder for executing at least one of a linear predictive decoding process and an entropy decoding process on the signal data of the N sub-bands outputted from the N sub-sampling means when the discrimination signal represents the fact that a linear predictive encoding process has been executed on the encoded data, and outputting the processed signal data of the N sub-bands.

According to a twentieth aspect of the present invention, there is provided a wide band audio signal encoding and decoding apparatus comprising a wide band audio signal encoding apparatus, and a wide band audio signal decoding apparatus. The wide band audio signal encoding apparatus comprises a sub-band dividing filter for dividing inputted wide band audio data into signal data of N sub-bands having the width of division and the number N of division predetermined based on signal band information of the inputted wide band audio data, and outputting the resulting data, N sub-sampling means for sub-sampling the signal data of the N sub-bands outputted from the sub-band dividing filter, respectively, and outputting the resulting data, N redundancy compressing means for compressing signal data by executing a predetermined reversible redundancy compressing process on the signal data of the N sub-bands outputted from the N sub-sampling means, and outputting the processed signal data, and a multiplexer for multiplexing the signal data of the N sub-bands outputted from the N redundancy compressing means with the signal information, and outputting the multiplexed encoded data.

The wide band audio signal decoding apparatus comprises a demultiplexer for demultiplexing signal data of a natural number N of sub-bands and signal information including a scale factor and signal band information of each sub-band from the inputted encoded data, N redundancy decompressing means for decompressing the signal data of the N sub-bands, respectively, by executing a redundancy decompression process on the signal data of the N sub-bands demultiplexed by the demultiplexer based on the scale factor of each sub-band within a predetermined time interval, and outputting the resulting data, N over-sampling means for determining an over-sampling frequency of each of the N over-sampling means based on the signal band information, executing an over-sampling process on the signal data of the N sub-bands outputted from the N redundancy decompressing means at predetermined respective over-sampling frequencies, respectively, and outputting the processed signal data of the N sub-bands, and a sub-band combining filter for combining the signal data of the N sub-bands outputted from the N over-sampling means, and outputting combined wide band audio data.

Therefore, both the characteristics of an extremely wide dynamic range and a wide band, as compared with those of the prior art, can be concurrently achieved at a relatively low bit rate per channel. In other words, the impurity of sound attributed to the deterioration of the distortion factor at a minute level is eliminated, and original sound reproduction of a signal reaching an ultrahigh frequency region of, for example, 120 kHz can be achieved. This allows the achievement of recording and reproduction capable of reproducing an extremely transparent natural sound extending to an ultrahigh frequency region, getting rid of the limited space of the prior art compact disc (CD) and the like, and a recording medium capable of recording a signal of the above wide band audio data and a reproduction sound field.

BRIEF DESCRIPTION OF THE DRAWINGS

FIGS. 4(a)–(i) are a spectrum chart showing sub-band dividing and sub-sampling methods in a second operation mode of the wide band audio signal encoding apparatus of FIG. 1;

FIG. 5 is a frequency characteristic chart showing sub-band dividing and encode-quantizing methods according to a first preferred embodiment of the first operation mode of the wide band audio signal encoding apparatus of FIG. 1;

FIG. 6 is a frequency characteristic chart showing sub-band dividing and encode-quantizing methods according to a second preferred embodiment of the first operation mode of the wide band audio signal encoding apparatus of FIG. 1;

FIG. 7 is a frequency characteristic chart showing sub-band dividing and encode-quantizing methods according to a third preferred embodiment of the first operation mode of the wide band audio signal encoding apparatus of FIG. 1 in the case where an example of a spectrum that reaches 100 kHz in a fortissimo part of a gamelan of an ethnic instrument is observed and this is encoded;

FIG. 8 is a frequency characteristic chart showing sub-band dividing and encode-quantizing methods according to a fourth preferred embodiment of the first operation mode of the wide band audio signal encoding apparatus of FIG. 1;

FIG. 9 is a frequency characteristic chart showing sub-band dividing and encode-quantizing methods according to a fifth preferred embodiment of the first operation mode of the wide band audio signal encoding apparatus of FIG. 1 in the case where a signal of a base band Bo is sampled at a sampling frequency of 96 kHz with 24 bits for quantization;

FIG. 10 is a frequency characteristic chart showing band-dividing and encode-quantizing methods according to a first preferred embodiment of the second operation mode of the wide band audio signal encoding apparatus of FIG. 1 in the case where the number of bits of the wide band audio data is 20 bits;

FIG. 11 is a frequency characteristic chart showing sub-band dividing and encode-quantizing methods according to a second preferred embodiment of the second operation mode of the wide band audio signal encoding apparatus of FIG. 1 in the case where the number of bits of the wide band audio data is 16 bits;

FIG. 12 is a frequency characteristic chart showing sub-band dividing and encode-quantizing methods according to a third preferred embodiment of the second operation mode of the wide band audio signal encoding apparatus of FIG. 1 in the case where the wide band audio data has its original sampling frequency of 96 kHz and a signal frequency band of 48 kHz;

FIG. 15 is a table showing a compatibility of a mutual operation between the prior art AV disk reproducer and the optical disk reproducer of the present preferred embodiment and that between the prior art AV disk and the optical disk of the present preferred embodiment;

DETAILED DESCRIPTION OF THE INVENTION

Figure 1:
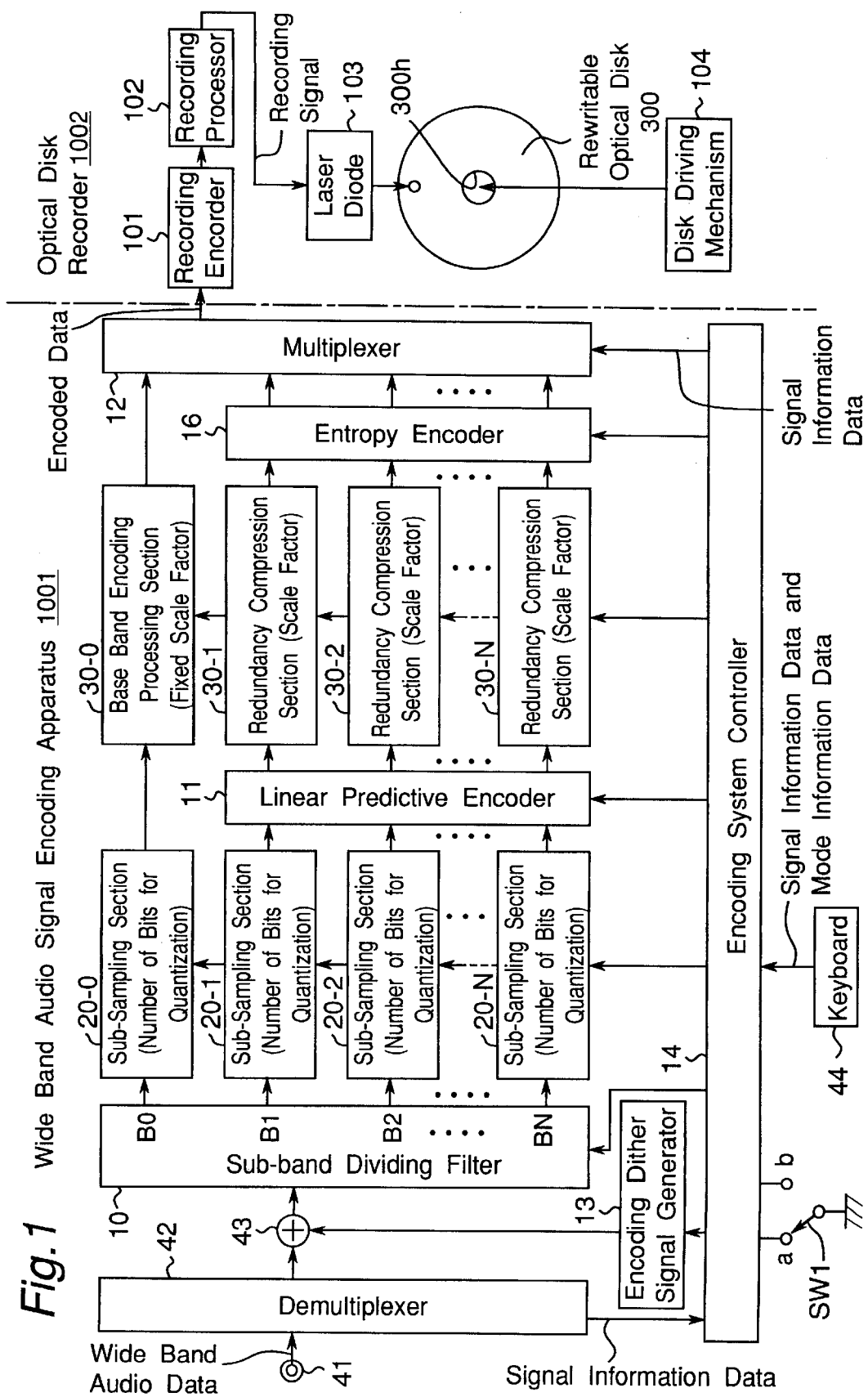
FIG. 1 is a block diagram showing a construction of a wide band audio signal encoding apparatus and an optical disk recorder according to a preferred embodiment of the present invention.
Figure 2:
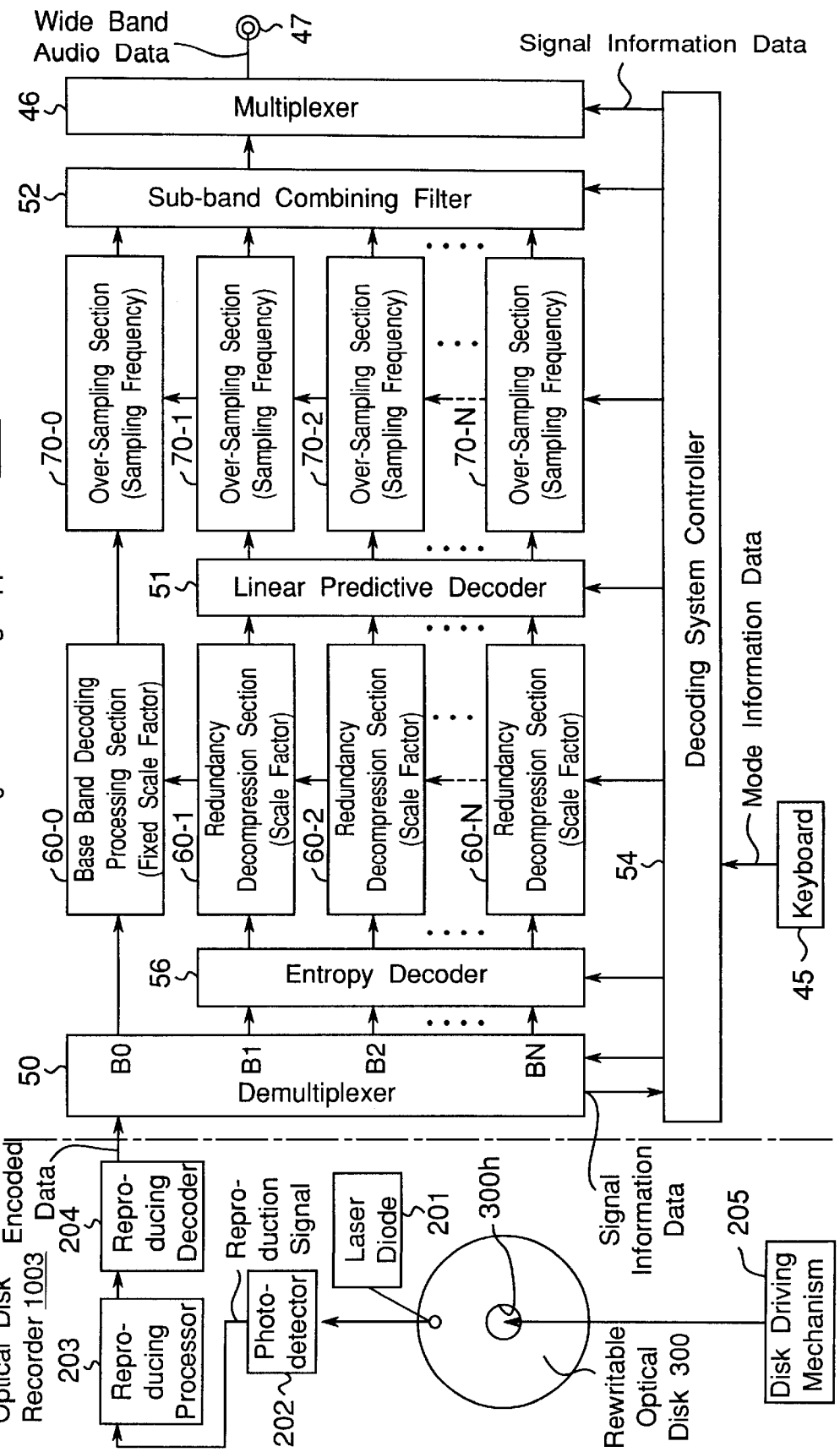
FIG. 2 is a block diagram showing a construction of an optical disk reproducer and a wide band audio signal decoding apparatus of the above preferred embodiment.

Preferred embodiments of the present invention will be described below with reference to the accompanying drawings. FIG. 1 is a block diagram showing constructions of a wide band audio signal encoding apparatus 1001 and an optical disk recorder 1002 according to a preferred embodiment of the present invention, and FIG. 2 is a block diagram showing constructions of an optical disk reproducer 1003 and a wide band audio signal decoding apparatus 1004 of the above preferred embodiment. First of all, the features and outline of the present preferred embodiment will be described below.

The wide band audio signal encoding apparatus of the present preferred embodiment shown in FIG. 1 is characterized in widening the sub-band up to a signal band of 120 kHz and allocating a maximum of 24 bits for quantization (i.e., the dynamic range is set to 144 dB or higher) when wide band high-output audio digital data extending up to a higher band is inputted, thereby encoding the above inputted audio digital data as an ultrahigh frequency region high-fidelity signal. Normally, the bits are reduced in number by securing a predetermined noise margin for each sub-band when the noise floor is relatively high. This can prevent the allocation of useless information to the data of only noise components, by which the necessary minimum bit rate corresponding to the noise floor depending on the system for collecting or gathering sound is allocated. In the signal data of all or at least some sub-bands out of N sub-bands, a signal peak level within a predetermined time period is detected to determine a scale factor and eliminate a high-order redundant run length for the removal of useless head room, thereby obtaining encoded data through compression of the inputted wide band audio data into the necessary minimum bit rate while scarcely generating loss. More preferably, a loss-less data compressing process is executed for every sub-band by at least one of linear predictive encoding and entropy encoding.

The optical disk recorder 1002 shown in FIG. 1 generates a recording signal by executing a predetermined recording encoding process, a recording signal amplifying process and the like on encoded data outputted from a multiplexer 12 of the wide band audio signal encoding apparatus 1001 and records the signal onto a phase change type rewritable optical disk 300, or a wide band audio signal recording medium. On the other hand, the optical disk reproducer 1003 shown in FIG. 2 obtains a reproduction signal by reproducing a recording signal recorded on the optical disk 300, decodes the original encoded data by executing a predetermined recording signal amplifying process, a reproduction decoding process and the like on the reproduction signal, and outputs the data to the wide band audio signal decoding apparatus 1004.

The wide band audio signal decoding apparatus 1004 shown in FIG. 2 receives the encoded data outputted from the optical disk reproducer 1003, demultiplexes the signal data of the N sub-bands and additional information such as compression information and time code of the N sub-bands from the encoded data, decompresses the resulting data every sub-band, determines an over-sampling frequency according to signal band information, executes over-sampling, combines the signal data of the N sub-bands, and then, outputs wide band audio data. Therefore, the wide band audio signal decoding apparatus 1004 widens the sub-band up to a signal band of 120 kHz and allocates a maximum of 24 bits for quantization (i.e., the dynamic range is set to 144 dB or higher) if wide band high-output data extending up to the maximum band is inputted, depending on the quality of the recording signal, thereby decoding it as an ultrahigh frequency region high-fidelity signal. In this case, the bits are normally reduced in number by securing a predetermined noise margin for each sub-band when the noise floor is relatively high, thereby preventing the allocation of useless information to the data of noise components, determining the scale factor of the sub-band, and outputting a high-efficiency wide band audio data from which the high-order redundant run length is eliminated.

In FIG. 1, inputted wide band audio data preferably include signal information data, which will be described in detail later, according to a time-division multiplexing method. The wide band audio signal encoding apparatus 1001 comprises:

- (a) a demultiplexer 42 which takes out signal information data from the wide band audio data inputted via an input terminal 41 in a demultiplexing manner, outputs the data to an encoding system controller 14, and then, outputs the remaining wide band audio data to an adder 43;
- (b) an encoding dither generator 13 that generates a dither signal having a minute level, and then, outputs the dither signal to the adder 43;
- (c) an adder 43 which adds the dither signal outputted from the encoding dither generator 13 to the wide band audio data outputted from the demultiplexer 42, and then, outputs the added data;
- (d) a sub-band dividing filter 10 which divides the added data outputted from the adder 43 into a plurality (N+1) of sub-bands Bo to BN;
- (e) sub-sampling sections 20-0 to 20-N which sub-sample the signal data of the plurality (N+1) of sub-bands each by the number of bits for quantization set by the encoding system controller 14;
- (f) a linear predictive encoder 11 which executes a linear predicting encoding process on the data outputted from the sub-sampling sections 20-1 to 20-N, and then, outputs the processed data;
- (g) a base band encoding processing section 30-0 which executes an encoding process on the data outputted from the sub-samling section 20-0 by a fixed scale factor, and then, outputs the processed data;
- (h) redundancy compression sections 30-1 to 30-N which compress the redundant run length data by executing an encoding process on the data outputted from the linear predictive encoder 11 by the respective scale factors set by the encoding system controller 14, and then, output the processed data;
- (i) an entropy encoder 16 which executes an entropy encoding process on the data outputted from the redundancy compression sections 30-1 to 30-N, and then, outputs the processed data;
- (j) a multiplexer 12 which executes a time-division multiplexing process so as to add the signal information data from the encoding system controller 14 to the data outputted from the base band encoding processing section 30-0 and the entropy encoder 16, and then, outputs the data obtained through the time-division multiplexing process as encoded data;
- (k) the encoding system controller 14 which controls the operation of the wide band audio signal encoding apparatus 1001; and
- (l) a switch SW1 which switches over between operation control to be executed based on the signal information data from the demultiplexer 42 and operation control to be executed based on the signal information data from a keyboard 44.

The signal information data that is the information representing the characteristics of the inputted wide band audio data includes information data relevant to the noise floor of an input signal and information data of an input signal band. Mode information data includes data relevant to determining whether or not to attach a dither signal generating process, a linear predicting process, and/or an entropy encoding process. When the switch SW1 is switched to the "a" side, the encoding system controller 14 selects the signal information data that has been demultiplexed by the demultiplexer 42, thereby controlling the operation of the wide band audio signal encoding apparatus 1001 based on the selected signal information data and the mode information data inputted by means of the keyboard 44. When the switch SW1 is switched to the "b" side, the encoding system controller 14 selects the signal information data and the mode information data inputted by means of the keyboard 44 and controls the operation of the wide band audio signal encoding apparatus 1001 based on the data. The operation control items of the encoding system controller 14 are as follows:

- (a) setting as to whether or not to generate an encoding dither signal in the encoding dither signal generator 13;
- (b) setting of bands of division in the sub-band dividing filter 10;
- (c) setting of the number of bits for quantization in the sub-sampling sections 20-0 to 20-N;
- (d) setting as to whether or not to operate the linear predictive encoder 11;
- (e) setting of the scale factor in the base band encoding processing section 30-0 and the redundancy compression sections 30-1 to 30-N; and
- (f) setting as to whether or not to operate the entropy encoder 16.

The set signal information data is outputted from the encoding system controller 14 to the multiplexer 12.

The encoded data outputted from the wide band audio signal encoding apparatus 1001 is further outputted to the optical disk recorder 1002, and a recording signal of the encoded data is recorded on the phase change type rewritable optical disk 300 that is a high-density wide band audio data recording medium. Then, the recorded signal inside the optical disk 300 is reproduced by the optical disk reproducer 1003 shown in FIG. 2 to obtain a reproduction signal, and the original encoded data is taken out of the reproduction signal by the optical disk reproducer 1003, and then, is outputted to the wide band audio signal decoding apparatus 1004.

The wide band audio signal decoding apparatus 1004 shown in FIG. 2 comprises:

(a) a demultiplexer 50 which executes the timedivision demultiplexing process so as to take out signal information data out from the inputted encoded data and to output the same to a decoding system controller 54, demultiplexes the remaining encoded data into the signal data of the N sub-bands BO to BN, and then, outputs the signal data of the N sub-bands B1 to BN to an entropy decoder 56;

(b) the entropy decoder 56 which executes an entropy decoding process reverse to the entropy encoding process on the signal data of the natural number N (N≧1) of sub-bands outputted from the demultiplexer 50, and then, outputs the processed data;

(c) a base band decoding processing section 60-0 which executes a decoding process reverse to the process in the base band encoding processing section 30-0 on the signal data of the sub-band of the base band outputted from the demultiplexer 50 and outputs the processed data;

(d) redundancy decompression sections 60-1 to 60-N which execute a redundancy decompression process reverse to the process in the redundancy compression sections 30-1 to 30-N with a scale factor set by the decoding system controller 54 on the data outputted from the entropy decoder 56, and then, output the processed data;

(e) a linear predictive decoder 51 which executes a linear predictive decoding process reverse to the process in the linear predictive encoder 11 on the data outputted from the redundancy decompression sections 60-1 to 60-N, and then, outputs the processed data;

(f) over-sampling sections 70-0 to 70-N which over-sample the data outputted from the base band decoding processing section 60-0 and the data outputted from the linear predictive decoder 51 at the respective sampling frequencies set by the decoding system controller 54, and then, output the processed data;

(g) a sub-band combining filter 52 which combines a plurality (N+1) of data outputted from the over-sampling sections 70-0 to 70-N, and then, outputs the combined wide band audio data;

(h) a multiplexer 46 which executes a time-division multiplexing process on the wide band audio data outputted from the sub-band combining filter 52 and the signal information data outputted from the decoding system controller 54, and then, outputs the multiplexed wide band audio data via an output terminal 47; and (i) the decoding system controller 54 which controls the operation of the wide band audio signal decoding apparatus 1004 based on the signal information data inputted from the demultiplexer 50 and the mode information data inputted by means of a keyboard 45.

The operation control items of the decoding system controller 54 are as follows:

(a) setting of bands of division in the demultiplexer 50;

(b) setting as to whether or not to operate the entropy decoder 56;

(c) setting of the scale factor in the base band decoding processing section 60-0 and the redundancy decompression sections 60-1 to 60-N;

(d) setting as to whether or not to operate the linear predictive decoder 51;

(e) setting of a sampling frequency in the over-sampling sections 70-0 to 70-N; and (f) setting of bands of division in the sub-band combining filter 52.

The decoding system controller 54 outputs the currently set signal information data to the multiplexer 46.

The preferred embodiment constructed above will be described in detail with regard to a variety of operation modes with reference to the drawings.

First of all, the encoding operation of the wide band audio signal encoding apparatus 1001 in a first operation mode of the present preferred embodiment will be described. In FIG. 1, the switch SW1 is, first of all, switched to, for example, the "a" side and the signal information data and the mode information data are inputted by means of the keyboard 44, the information data being inputted to the encoding system controller 14. In response to this, the encoding system controller 14 executes setting of the operation of each part as described above. In the present preferred embodiment, the wide band audio data inputted from the input terminal 41 has a sampling frequency of, for example, 240 kHz and a word length (or the number of bits per data) of 24 bits, and the data is inputted to the sub-band dividing filter 10 via the demultiplexer 42 and the adder 43. In this case, the signal information data is calculated, for example, in the following manner. Based on the known parameters of the studio background noise, the noise level of a microphone amplifier, the specifications of the analog-to-digital or A/D converter and so on in forming wide band audio data, an effective frequency band and the noise floor of each sub-band of 24 kHz are separately calculated, and the noise floor information data and the input signal band information data are calculated. For the mode information data, information for commanding a request for an encoding process of the wide band audio mode in the first operation mode is inputted by means of the keyboard 44. Based on these commands, the encoding system controller 14 executes the setting of the sub-band dividing filter 10. The sub-band dividing filter 10 divides the wide band audio data into, for example, five band data (i.e., N=4) including the base band B0 and the sub-bands B1 to B4.

FIGS. 3(a)–(k) are a spectrum chart showing sub-band dividing and sub-sampling methods in the first operation mode of the wide band audio signal encoding apparatus 1001 of FIG. 1.

Figure 3:
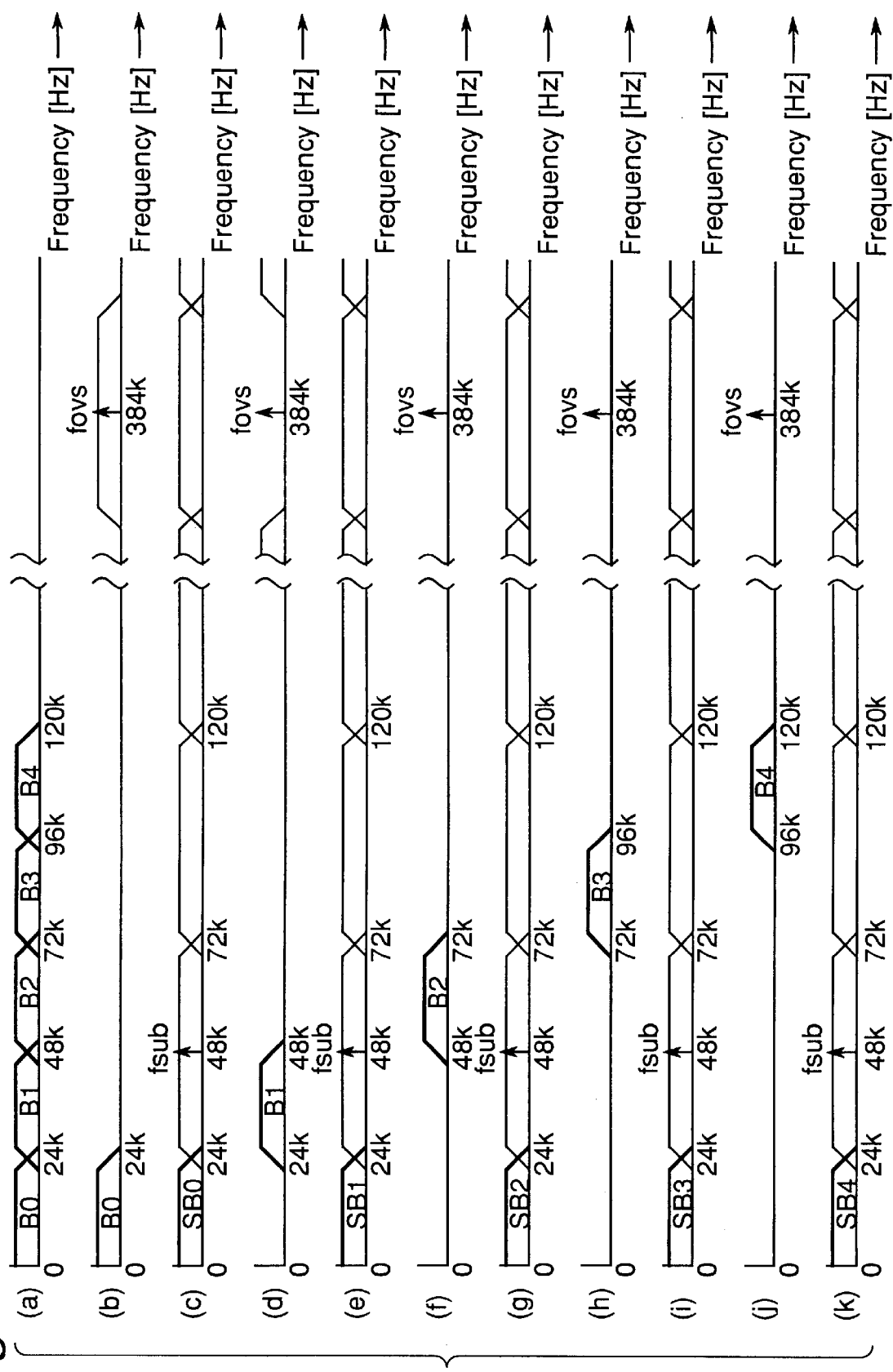
FIGS. 3(a)–(k) are a spectrum chart showing a sub-band dividing and sub-sampling methods in a first operation mode of the wide band audio signal encoding apparatus of FIG. 1.

As shown in FIG. 3(a), in the sub-band dividing filter 10, the sub-band B0 is set to a band ranging from a signal frequency of 0 to 24 kHz, the sub-band B1 is set to a band ranging from the signal frequency of 24 kHz to 48 kHz and the sub-band B2 to the sub-band B4 are sequentially divided into bands every 24 kHz up to 120 kHz. The sub-band dividing filter 10 is preferably constructed of a Poly-phase Quadrature Mirror Filter (referred to as QMF hereinafter) of an eightfold or higher over-sampling process for canceling an aliasing distortion occurring in the vicinity of the crossover portions between bands.

Description will be made with reference to FIG. 1 and FIGS. 3(a)–(k). The signal spectrum of the output data of the base band B0 from the sub-band dividing filter 10 becomes B0 as shown in FIG. 3(b). In FIGS. 3(a)–(k), fovs represents an over-sampling frequency of QMF, and it is set to 384 kHz. The output data of the base band B0 from the sub-band dividing filter 10 is sub-sampled at a sub-sampling frequency fsub=48 kHz by the sub-sampling section 20-0. The signal spectrum of the sub-sampled data is converted into lower-frequency data SB0 as shown in FIG. 3(c). Likewise, the signal spectrums of the data of the sub-bands B1, B2, B3 and B4 shown in FIGS. 3(d), 3(f), 3(h) and 3(j) are respectively sub-sampled to lower frequency regions so as to become SB1 shown in FIG. 3(e), SB2 shown in FIG. 3(g), SB3 shown in FIG. 3(i) and SB4 shown in FIG. 3(k). The bit rate of each sub-band is 1.152 Mbps since the sub-sampling frequency is 48 kHz and the number of bits for quantization is 24 bits, and the overall maximum bit rate of the base band B0 to the sub-band B4 becomes 5.76 Mbps.

FIG. 5 is a frequency characteristic chart showing sub-band dividing and encode-quantizing methods according to a first preferred embodiment of the first operation mode of the wide band audio signal encoding apparatus 1001 of FIG. 1. In FIG. 5, the horizontal axis represents the signal frequency, the left-hand vertical axis represents the signal level, and the right-hand vertical axis represents the number of bits for encoding. With the setting as described above, it is allowed to widen the signal band of the sub-band up to 120 kHz and allocate a maximum of 24 bits for the quantization of the sub-bands (i.e., the dynamic range is set to 144 dB or higher) if wide band high-output data extending up to the maximum band is inputted, thereby allowing a high-fidelity signal reaching the ultrahigh frequency region to be encoded. With this maximum performance maintained, lossless encoding is executed according to the following four methodical procedures paying attention to the data signal component of each sub-band.

The first method is to prevent useless information from being allocated by preparatorily knowing the noise floor of the input signal. Even in the excellent environment of the studios of late, the overall sound collecting and sound gathering dynamic range is about 120 dB at most without auditory sensation correction. In the frequency band of 20 kHz to 100 kHz, the electric characteristics of the A/D converter becomes strict and the dynamic range becomes narrower, meaning that a dynamic range of about 80 dB is barely secured. An epoch-making invention is expected in the future, however, it is estimated that improvements will be made at slow pace for the time being.

FIG. 6 is a frequency characteristic chart showing sub-band dividing and encode-quantizing methods according to a second preferred embodiment of the first operation mode of the wide band audio signal encoding apparatus 1001 of FIG. 1. FIG. 6 shows the sound recording noise floor of the wide band audio data in the above-mentioned present sound collecting environment and an example of the setting of the minimum level of code quantization based on the noise floor information data. In FIG. 6, the horizontal axis and the vertical axis are set similar to those of FIG. 5.

The encoding system controller 14 determines the necessary number of bits for quantization in each sub-band based on the noise floor information data and controls the sub-sampling sections 20-0 to 20-4 so that the determined number of bits for quantization is set. The number of bits for quantization of the base band BO is set to 24 bits conforming to a format selected from the prior art SD format proposals. For the number of bits for quantization, 20 bits and 16 bits can be alternatively selected. Since the sound collecting noise floor corresponding to it is−105 to−115 dB in the sub-band B1, the number of bits for quantization is set to 22 bits so that an encoding quantization noise of not greater than−132 dB can be obtained. The number of bits of the quantization step size is set by thus providing a margin of about 20 dB for the sound collecting noise floor. This arrangement is to faithfully encode even the signals buried underneath the sound collecting noise floor. Likewise, the numbers of bits for quantization of the sub-band B2 to the sub-band B4 are set to 20, 18 and 16 bits, respectively.

The number of bits for quantization, or the quantization step size is inherent in the sound collecting system, and therefore, it should preferably be fixed in sound collecting unit, i.e., in a unit of program. These quantization step size information or a discrimination signal representing the information of the number of bits for quantization is time-division multiplexed with the signal data. The sub-sampling sections 20-0 to 20-4 sub-sample the inputted signal data at a sub-sampling frequency fsub=48 kHz to execute down-conversion, and then, output the processed data having the above-mentioned predetermined number of bits for quantization. By thus preventing the allocation of useless information quantity to the data full of noise components while securing a margin, the necessary minimum bit rate corresponding to the noise floor inherent in the sound collecting system is allocated. In the example shown in FIG. 6, the maximum bit rate of the signal data of each sub-band becomes 1.152 Mbps in the base band B0, becomes 1.056 Mbps in the sub-band B1, becomes 0.960 Mbps in the sub-band B2, becomes 0.864 Mbps in the sub-band B3 and becomes 0.768 Mbps in the sub-band B4. Therefore, the overall maximum bit rate becomes 4.800 Mbps, which is reduced to about 83% from the original bit rate of 5.76 Mbps shown in FIG. 5.

In the case of collecting sound by linear quantization, the higher harmonic frequency components of the signal and the quantization noise spectrum interfere with each other, possibly causing a noisy inherent spectrum particularly at a minute level. In order to prevent this, by adding a dither signal having a very small amplitude generated by the encoding dither generator 13 to the wide band audio data inputted from the input terminal 41 via the demultiplexer 42 by means of the adder 43 for the dispersion of the inherent noise spectrum in the wide band audio data signal, the auditory sensation effect can be further improved. Therefore, it is acceptable to add the dither signal outputted from the encoding dither generator 13 to the wide band audio data.

Preferably, a linear predictive encoding process is executed on the output data from the sub-sampling sections 20-0 to 20-4 by the linear predictive encoder 11 as a pre-process for increasing the compressing effect of the redundancy compression sections 30-1 to 30-4. The linear predictive encoder 11 has an effect of suppressing the peak of the low-frequency spectrum by encoding a prediction residual difference, by which the spectrum can be flattened in the case where the signal spectrum distribution is the bass-concentrated and treble-attenuated type.

Next, the output data from the sub-sampling section 20-0 and the linear predictive encoder 11 are inputted to the base band encoding processing section 30-0 and the redundancy compression sections 30-1 to 30-4. The base band encoding processing section 30-0 has a fixed scale factor, which is equal to that of the input wide band audio data.

Next, the second method will be described. The redundancy compression sections 30-1 to 30-N detect the peak of the signal level of each sub-band in a unit of program or every predetermined time for the setting of the scale factor, eliminate the redundant run-length portion of the high-order bits and transmit the scale factor in a time-division multiplexing manner by a built-in multiplexer. Thus, the redundant run length data is compressed.

It is acceptable to transmit the scale factor determined by the redundancy compression sections 30-1 to 30-N to the multiplexer 12 via the encoding system controller 14 and subject the encoded data and the scale factor to the time-division multiplexing by the multiplexer 12.

Further, the third method will be described. The entropy encoder 16 divides the signal data of each sub-band from the redundancy compression sections 30-1 to 304 at predetermined time intervals so in which the word length is set as to form a conversion table frequency of patterns appearing in the time interval and executes data compression based on this conversion table. A plurality of conversion tables for use are formed and an adaptation process for selectively using ones having a high compression rate is executed. With this arrangement, further data compression is executed. The signal data obtained through the compressing process are the loss-less codes that can reproduce the original data by the conversion tables provided for the entropy decoder 56.

Figure 16:
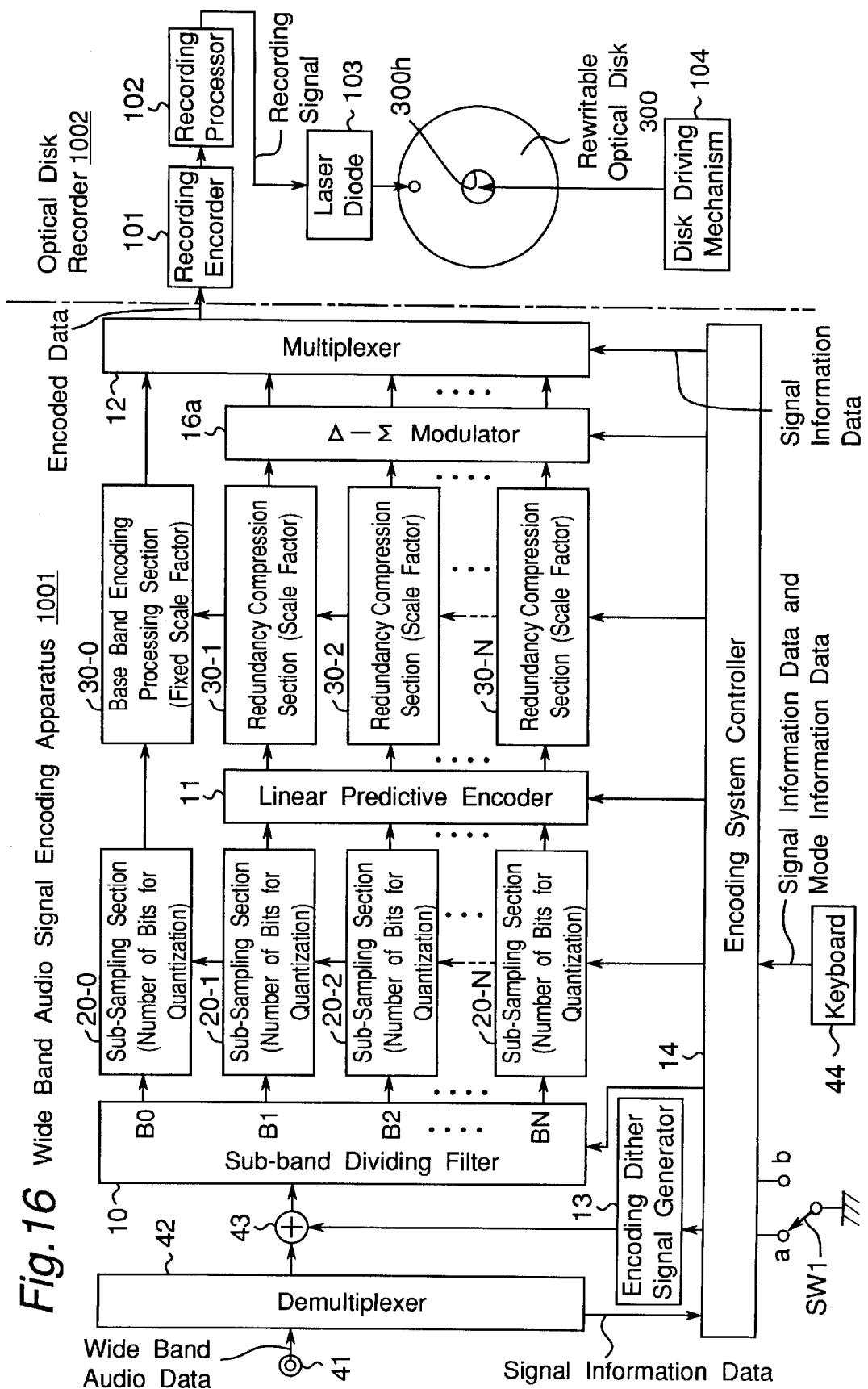
FIG. 16 is a block diagram showing a construction of a wide band audio signal encoding apparatus and an optical disk recorder according to a modified example of the present invention.
Figure 17:
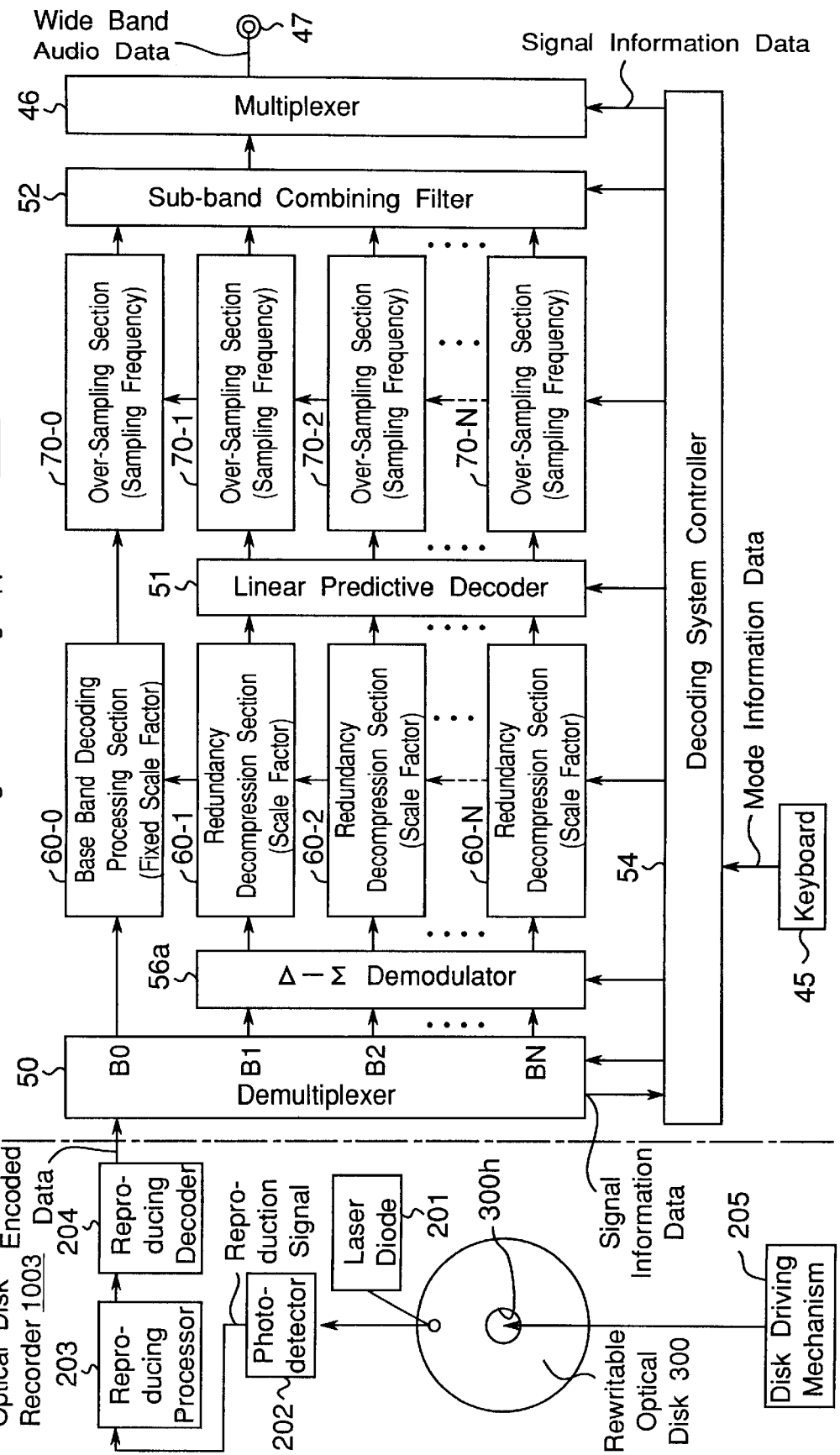
FIG. 17 is a block diagram showing constructions of an optical disk reproducer and a wide band audio signal decoding apparatus of the above modified example.

It is also acceptable to provide a Δ-Σ modulator 16a as shown in FIG. 16 in place of, for example, the entropy encoder 18. In this case, the word length of the signal data of each sub-band is converted into a bit stream, and the dynamic range of the required band is secured by a Δ-Σ modulation shaping filter. In the modification example, the entropy decoder 56 shown in FIG. 2 is replaced by a Δ-Σ demodulator 56a as shown in FIG. 17.

An example in which the actual music is encoded will be described next.

FIG. 7 is a frequency characteristic chart showing sub-band dividing and encode-quantizing methods according to a third preferred embodiment of the first operation mode of the wide band audio signal encoding apparatus 1001 of FIG. 1 in the case where an example of a spectrum that reaches 100 kHz in a fortissimo part of a gamelan of an ethnic instrument is observed and this is encoded. The dashed line in FIG. 7 is obtained by plotting the peak levels in the program of a signal of the fortissimo part of the gamelan of the ethnic instrument. As described above, frequency components up to 100 kHz are observed in the natural world. However, the sound energy tends to decrease as the frequency becomes higher. The redundancy compression sections 30-1 to 30-4 compress the signal data by eliminating the high-order redundant run length on determining the scale factor based on the peak level in the signal data of each sub-band.

As shown in FIG. 7, the scale factor of the sub-band B1 is set to 4, the scale factor of the sub-band B2 is set to 8, the scale factor of the sub-band B3 is set to 12 and the scale factor of the sub-band B4 is set to 13. That is, the scale factor of the present preferred embodiment represents the number of bits to be reduced. As a result, four bits out of 22 bits are reduced in the sub-band B1, thereby allowing the whole information data to be thoroughly expressed by 18 bits. Likewise, the whole information data can be expressed without deterioration by 12 bits in the sub-band B2, by seven bits in the sub-band B3 and by four bits in the sub-band B4. The encoding free of deterioration is referred to as loss-less encoding. The loss-less encoded data with a scale factor as described above can decompress the total information data without deterioration through decoding subsequent to the recording and reproduction or transmission.

In this case, the transmission bit rate of the signal data of each sub-band in FIG. 7 becomes 1.152 Mbps in the base band B0, becomes 0.864 Mbps in the sub-band B1, becomes 0.576 Mbps in the sub-band B2, becomes 0.336 Mbps in the sub-band B3 and becomes 0.192 Mbps in the sub-band B4. Therefore, the overall maximum bit rate becomes 3.120 Mbps, which is reduced to about 54% of the bit rate of 5.76 Mbps in the case where neither noise floor compression nor run-length compression is executed. As a result, the transmission bit rate of the signal data of two channels becomes 6.24 Mbps, which does not exceed 6.75 Mbps, or the upper limit of the temporary allocation of the SD format.

FIG. 8 is a frequency characteristic chart showing sub-band dividing and encode-quantizing methods according to a fourth preferred embodiment of the first operation mode of the wide band audio signal encoding apparatus 1001 of FIG. 1. FIG. 8 shows a relation between the spectrum of the fortissimo part and the bit rate when encoding a classic music. The sound collecting system environment is set similar to the case of FIG. 7, and therefore, the noise floor and the number of bits for quantization can be set to be equal to them. However, since the peak spectrum in the treble region is lower than that of the gamelan music, the redundant run-length compression effect is greater. In FIG. 8, the required number of bits for quantization and the transmission bit rate become 15 bits/0.72 Mbps in the sub-band B1, become 8 bits/0.384 Mbps in the sub-band B2, become 5 bits/0.24 Mbps in the sub-band B3 and become 4 bits/0.192 Mbps in the sub-band B4. Therefore, the overall maximum bit rate becomes 2.688 Mbps. This can be reduced to about 47% of the bit rate of 5.76 Mbps in the case where neither noise floor compression nor run-length compression shown in FIG. 5 is executed. As a result, the bit rate becomes 5.376 Mbps in two channels, which does not exceed 6.75 Mbps that is the upper limit of allocation of DVD. When recording the above signal data on a DVD, the recording time becomes about two hours, also providing excellent practicability.

The reason why the base band B0 is not compressed and maintained at 1.152 Mbps in the above preferred embodiment is that the audio signal format in the present preferred embodiment is set to be equal to the SD audio signal format. In the SD format, the combinations of the sampling frequency, the number of bits for quantization and the number of channels are as shown in the following Table 1.

TABLE 1

| Sampling Frequency | 48 kHz, 96 kHz |
|---|---|
| Number of bits for quantization | 16 bits, 20 bits, 24 bits |
| Number of Channels | 1–8 Channels |

Accordingly, in terms of securing compatibility, it is preferable to select the base band B0 from the above Table 1. By so doing, the basic format of SD and the format of the base band as a common format, and reproduction of the signal data of the base band B0 can be handled, so that compatibility between the reproducing apparatus having the basic format of SD and the optical disk reproducer 1002 of the present preferred embodiment can be secured. That is, as shown in FIG. 15, a compatibility is produced such that even the prior art AV disk reproducer or player which copes with only the basic format of SD can take out the data of a common part from the encoded data of the recording signal of the optical disk of the present preferred embodiment for the reproduction of the data. Furthermore, in a super-high-fidelity disk player, or the optical disk recording and reproducing apparatus provided with the optical disk recorder 1002 and the optical disk reproducer 1003 of the present preferred embodiment, there is produced the possibility that the signal reproducing section and the base band processing section of the prior art AV disk recorded by the basic format of SD can be commonly designed. In this case, the manufacturing cost can be remarkably reduced.

FIGS. 4(a)–(i) are a spectrum chart showing sub-band dividing and sub-sampling methods according to a second operation mode of the wide band audio signal encoding apparatus 1001 of FIG. 1. As shown in FIG. 4(a), division is effected so that the base band B0 is set to a band of a signal frequency ranging up to 48 kHz, the sub-band B1 is set to a band of a signal frequency ranging from 48 kHz to 72 kHz, and the sub-band B2 and the sub-band B3 are set every 24 kHz to a band ranging up to 120 kHz. The over-sampling frequency fovs of the sub-band dividing filter 10 constructed of QMF is set to 384 kHz. The signal spectrum of the output data of the base band B0 from the sub-band dividing filter 10 is as shown in FIG. 4(*b*). The signal spectrum obtained by sub-sampling the output data at a sub-sampling frequency fsub0=96 kHz is shown in FIG. 4(*c*). As described above, the signal data of the base band is converted into low-frequency data. Likewise, the signal spectrums of the sub-bands B1, B2 and B3 become as shown in FIGS. 4(*d*), 4(*f*) and 4(*h*), while the spectrums sub-sampled to the low-frequency regions at the sub-sampling frequencies fsub1 to fsub3 become as shown in FIGS. 4(*e*), 4(*g*) and 4(*i*), respectively.

FIG. 9 is a frequency characteristic chart showing sub-band dividing and encode-quantizing methods according to a fifth preferred embodiment of the first operation mode of the wide band audio signal encoding apparatus 1001 of FIG. 1 in the case where a signal of a base band B0 is sampled at a sampling frequency of 96 kHz with 24 bits for quantization. FIG. 9 shows an example of encoding characteristics of the wide band audio signal encoding apparatus 1001 in the second operation mode in the case where a signal of a fortissimo part of a gamelan music having a very large spectrum in the treble region is inputted. When the wide band audio data indicated by the dashed line in FIG. 9 is inputted, the overall maximum bit rate becomes 3.36 Mbps. Also, this value does not exceed the upper limit of 6.75 Mbps in two channels of the above-mentioned temporary allocation of the SD format.

FIG. 10 is a frequency characteristic chart showing sub-band dividing and encode-quantizing methods according to a first preferred embodiment of the second operation mode of the wide band audio signal encoding apparatus 1001 of FIG. 1 in the case where the number of bits of the wide band audio data is 20 bits. The information data are inputted as noise floor information data by means of the keyboard 44, and the encoding system controller 14 sets the sub-band dividing method and code quantizing method based on the information date. In this case, the number of bits for quantization is set to a maximum of 20 bits in all of the sub-bands, including the base band B0. The overall maximum bit rate in this case becomes 2.832 Mbps.

FIG. 11 is a frequency characteristic chart showing sub-band dividing and encode-quantizing methods according to a second preferred embodiment of the second operation mode of the wide band audio signal encoding apparatus 1001 of FIG. 1 in the case where the number of bits of the wide band audio data is 16 bits. In this case, the number of bits for quantization is set to a maximum of 16 bits in all the sub-bands including the base band B0. In this case, the overall maximum bit rate becomes 2.208 Mbps.

FIG. 12 is a frequency characteristic chart showing sub-band dividing and encode-quantizing methods according to a third preferred embodiment of the second operation mode of the wide band audio signal encoding apparatus 1001 of FIG. 1 in the case where the wide band audio data has its original sampling frequency of 96 kHz and a signal frequency band of 48 kHz. In this case, input signal band information data are inputted by means of the keyboard 44, while the encoding system controller 14 operates to determine the required sub-band bands and controls the operations of the sub-band dividing filter 10 and the sub-sampling sections 20-0 to 20-4 so that the determined bands are set in the sub-band dividing filter 10 and the sub-sampling sections 20-0 to 20-4. Further, bits are allocated to only the base band B0 and the sub-band B1 and not to the sub-band B2 to the sub-band B4. In this case, the overall maximum bit rate is 2.016 Mbps.

Figure 13:
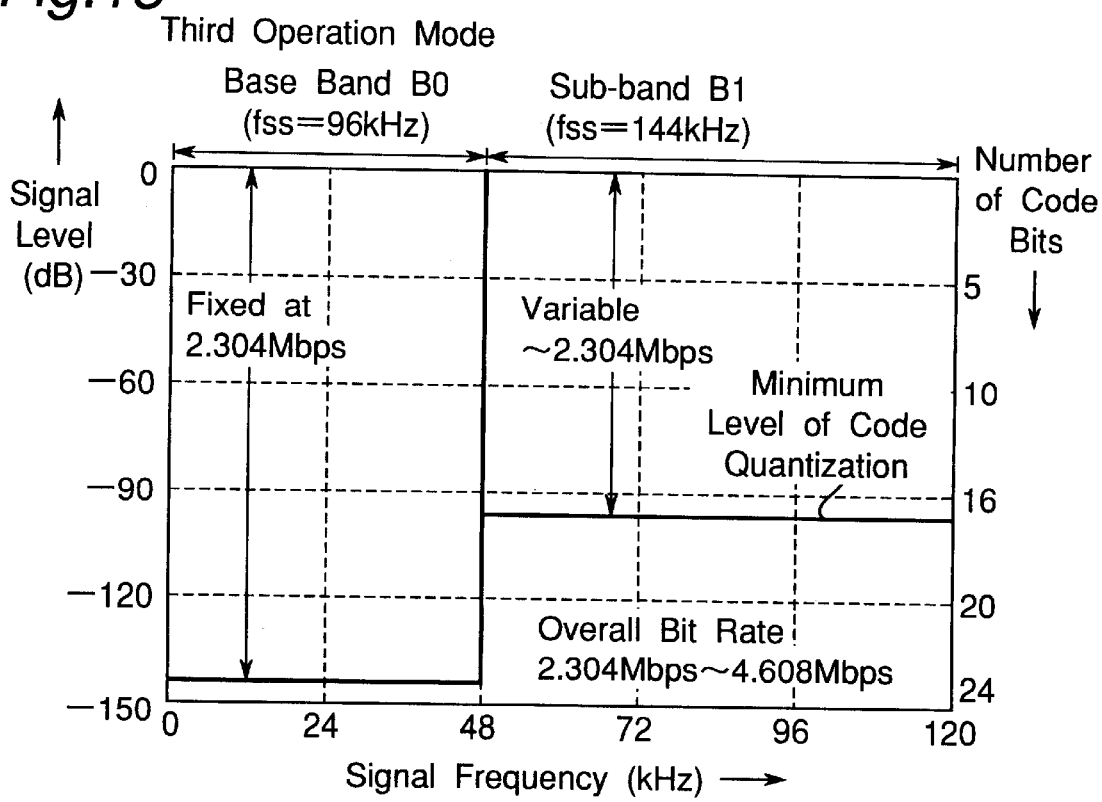
FIG. 13 is a frequency characteristic chart showing sub-band dividing and encode-quantizing methods in a third operation mode of the wide band audio signal encoding apparatus of FIG. 1.

FIG. 13 is a frequency characteristic chart showing sub-band dividing and encode-quantizing methods in a third operation mode of the wide band audio signal encoding apparatus 1001 of FIG. 1. FIG. 13 shows a simplified example of a preferred embodiment in which the signal frequency band of the base band B0 is set to 0 to 48 kHz and the band of the sub-band B1 is set to 48 kHz to 120 kHz, thereby achieving a division into a total of two bands.

Figure 14:
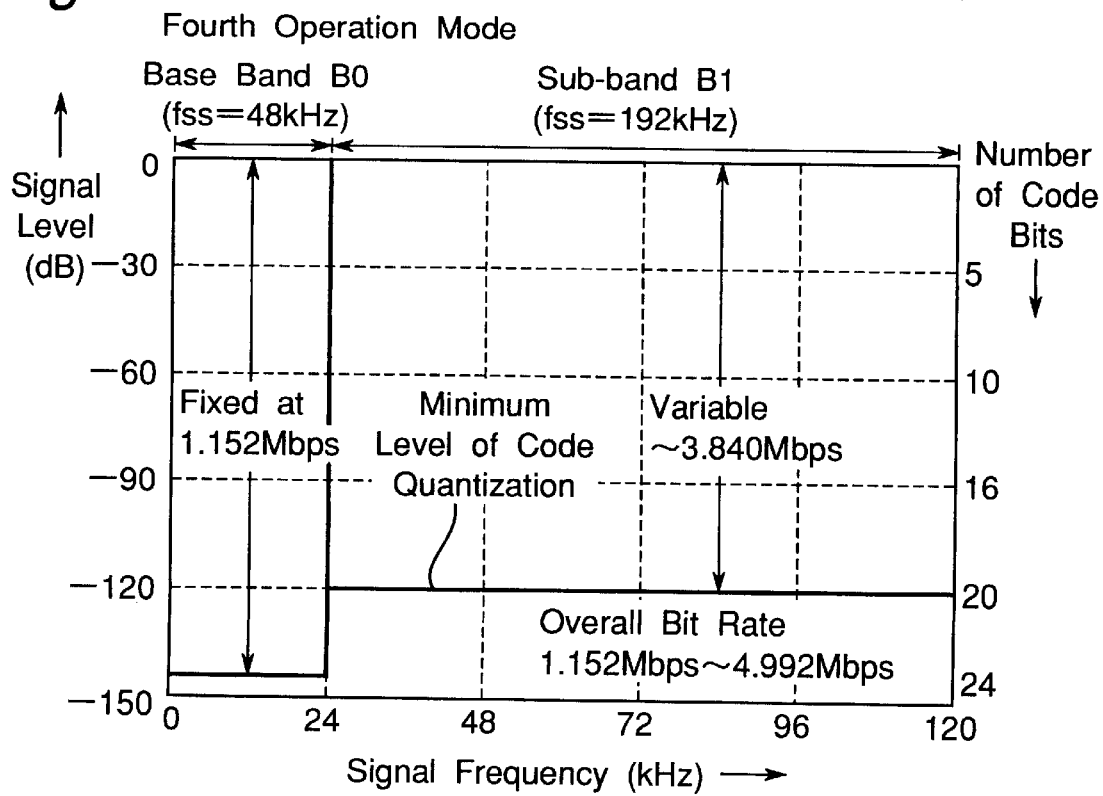
FIG. 14 is a frequency characteristic chart showing sub-band dividing and encode-quantizing methods in a fourth operation mode of the wide band audio signal encoding apparatus of FIG. 1.

FIG. 14 is a frequency characteristic chart showing sub-band dividing and encode-quantizing methods in a fourth operation mode of the wide band audio signal encoding apparatus 1001 of FIG. 1. FIG. 14 shows another example of a preferred embodiment in which the signal frequency band of the base band B0 is set to 0 to 24 kHz and the band of the sub-band B1 is set to 24 kHz to 120 kHz, thereby achieving a division into a total of two bands. No detailed description is provided for this.

As shown in FIG. 1 and FIG. 2, by virtue of the provision of the entropy encoder 16 and the entropy decoder 56, the encoded data of the present preferred embodiment has a compressing effect and allows the decoding to be achieved in a loss-less style, because it is reversible.

As described above, the processed signal data of the base band, the signal data of N sub-bands, the scale factor of the N sub-bands, a discrimination signal indicating whether or not a dither signal has been added, a discrimination signal indicating whether or not the data are the linear predictive codes, a discrimination signal indicating whether or not the entropy encoding has been executed, a discrimination signal indicating the type of the conversion table of the entropy encoder, a discrimination signal indicating whether or not the $\Delta$-$\Sigma$ modulation has been executed and so on, are temporarily stored in a memory in the multiplexer 12. The data are successively read from the memory and subjected to a time-division multiplexing process so that they are converted into a predetermined data format for the recording thereof on the optical disk 300, such as DVD, and the multiplexed encoded data is outputted to the optical disk recorder 1002.

The optical disk recorder 1002 is an apparatus for generating a recording signal by executing a predetermined recording encoding process, a recording signal amplifying process and so forth, on the encoded data outputted from the multiplexer 12 of the wide band audio signal encoding apparatus 1001, and recording the signal on the phase change type rewritable optical disk 300. As shown in FIG. 1, the apparatus is provided with a recording encoder 101, a recording processor 102, a laser diode 103, and a disk driving mechanism 104. In this case, the optical disk 300 is a high-density recording type optical disk which has a center hole 300*h* and is provided with a recording data format conforming to the DVD recording format. The optical disk 300 is loaded in a predetermined loading position inside the optical disk recorder 1002 and rotated by the disk driving mechanism 104. The recording encoder 101 executes a predetermined recording encoding process according to a predetermined error correcting system on the encoded data outputted from the multiplexer 12 of the wide band audio signal encoding apparatus 1001, and then, outputs, for example, encoded data provided with a parity to the recording processor 102. The recording processor 102 converts the inputted encoded data into a recording signal, amplifies the recording signal, and then, outputs the amplified recording signal to the laser diode 103. The laser diode 103 generates a laser light modulated in accordance with the recording signal for the recording and applies the laser light to the recording portion of the optical disk 300, thereby recording the recording signal on the optical disk 300.

The optical disk reproducer 1003 is an apparatus which reproduces the recording signal recorded on the optical disk 300 to obtain a reproduction signal and generates the original encoded data by executing a predetermined recording signal amplifying process, a reproduction decoding process and the like on the reproduction signal. As shown in FIG. 2, the optical disk reproducer 1003 is provided with a laser diode 201, a photo-detector 202, a reproducing processor 203, a reproducing decoder 204 and a disk driving mechanism 205. In this case, the optical disk 300 is loaded in a predetermined loading position inside the optical disk reproducer 1003 and rotated by the disk driving mechanism 205. The laser diode 201 generates a relatively weak continuous laser light for reproduction and applies a laser light to a reproducing portion of the optical disk 300. Light reflected on the portion of the optical disk 300 is incident on the photo-detector 202, and the photo-detector 202 detects the reflected light, converts it into an electric signal, and then, outputs the electric signal to the reproducing processor 203. The reproducing processor 203 converts the inputted electric signal, through a waveform shaping process, into pulse-shaped digital data. Then, the reproducing decoder 204 removes the parity for the above-mentioned error correction and takes out the original encoded data by executing a reproducing decoding process reverse to the recording encoding process of the recording encoder 102 on the converted digital data, and then, outputs the data to the wide band audio signal decoding apparatus 1004.

In regard to the rewritable optical disk 300, an optical recording layer is formed on at least one surface of the disk 300, where a first reflectance represents information data "0" and a second reflectance represents information data "1". When recording the information data "0" or "1", a laser light having a first light intensity or a second light intensity is applied from the laser diode 103 to a certain recording portion of the optical disk 300. Then, the reflectance of the recording layer attains a first value or a second value according to the intensity of the laser light. When reading the information data, a weak laser light is continuously applied from the laser diode 201 to a certain reproducing portion of the optical disk 300. Then, for example, the value of the intensity of reflection light is detected by the photo-detector 202, and the detected signal becomes a reproduction signal.

The operation of the wide band audio signal decoding apparatus 1004 will be described in detail next with reference to FIG. 2.

In FIG. 2, mode information data for commanding the whole operation of the wide band audio signal decoding apparatus 1004 is inputted by means of the keyboard 45, and the mode information data is inputted to the decoding system controller 54. The demultiplexer 50 demultiplexes the noise floor information data and the input signal band information data from the inputted encoded data, and then, outputs them to the decoding system controller 54. In response to this, the decoding system controller 54 controls the whole operation of the apparatus 1004. The demultiplexer 50 demultiplexes the signal data of the base band and the signal data of the N sub-bands from the remaining encoded data, outputs the signal data of the base band to the base band decoding processing section 60-0, and then, outputs the signal data of the N sub-bands to the entropy decoder 56. In this case, the base band decoding processing section 60-0 executes a special decoding process for the base band, and then, outputs the processed signal data to the over-sampling section 70-0. On the other hand; an entropy decoding process is executed by the entropy decoder 56 on the signal data of the N sub-bands except for the base band, and the processed signal data are outputted to the redundancy decompression sections 60-1 to 60-N. The redundancy decompression sections 60-1 to 60-N decompress the respective input signal data by reproducing and attaching redundant run-length data, and then, output the decompressed signal data to the linear predictive decoder 51. The linear predictive decoder 51 executes a linear predicting process on the signal data of the N sub-bands outputted from the redundancy decompression sections 60-1 to 60-N, and then, outputs the processed signal data of the N sub-bands to the over-sampling sections 70-1 to 70-N. The over-sampling sections 70-0 to 70-N have their sampling frequencies set by the decoding system controller 54, over-sample the signal data outputted from the base band decoding processing section 60-0 and the linear predictive decoder 51, and then, output the processed signal data to the sub-band combining filter 52. In response to this, the sub-band combining filter 52 combines (N+1) pieces of signal data, and then, outputs the combined decoded data via the multiplexer 46 and the output terminal 47. The outputted wide band audio data is converted into a wide band audio analog signal by a wideband high-bit digital-to-analog or D/A converter (not shown) and thereafter the converted analog signal is reproduced via a loudspeaker (not shown).

The following describes the case where a recording signal is reproduced by means of the optical disk 300 that is the wide band audio signal recording medium on which music of a gamelan of an ethnic instrument is recorded and the encoded data of the reproduction signal is loss-less decoded. As shown in FIG. 7, the scale factor is set to four in the sub-band B1, set to eight in the sub-band B2, set to 12 in the sub-band B3 and set to 13 in the sub-band B4. The signal data of the sub-band B1 represents the whole information data by 18 bits obtained by eliminating four bits from the 22 bits, and therefore, it decompresses the data into 24-bit data by attaching two bits of the noise floor to the least significant bit LSB side and attaching four bits of the redundancy headroom to the most significant bit MSB side. Likewise, the whole information data is expressed by 12 bits in the sub-band B2, by seven bits in the sub-band B3 and by four bits in the sub-band B4. Therefore, the data is decompressed into 24-bit data by attaching bits to the least significant bit LSB side and to the most significant bit MSB side. In regard to the loss-less encoded data with the scale factor, the whole information data are thus decompressed by the wide band audio signal decoding apparatus 1004, and therefore, no deterioration is generated. Through the above processes, the transmission bit rate of signal data of each sub-band becomes 1.152 Mbps in the base band B0, becomes 0.864 Mbps in the sub-band B1, becomes 0.576 Mbps in the sub-band B2, becomes 0.336 Mbps in the sub-band B3 and becomes 0.192 lops in the sub-band B4. Therefore, the overall maximum bit rate becomes 3.120 Mbps. The wide band audio signal decoding apparatus 1004 decompresses the signal data having the overall maximum bit rate of 3.120 Mbps into full-band full-bit wide band audio data having a bit rate of 5.76 Mbps as shown in FIG. 5. Then, the wide band audio data is converted into a wide band audio analog signal by, for example, a high-performance D/A converter (not shown) with a sampling frequency of 240 kHz and a word length of 24 bits so as to be reproduced.

Among audio reproducing apparatuses, there are many applications of portable types and automobile on-board types. For such applications, power consumption is especially important in addition to compact and lightweight design. Since the noise floor is high in the reproduction environment, it is determined to set the specifications of the decoding signal processor and the specifications of the D/A converter to those required by the performances, so that the necessary minimum dynamic range and frequency characteristic are achieved, taking the fact that reproduction with the wide dynamic range at the sound collecting time is not taken into consideration. The throughput is reduced by this limitation of the specifications, and this consequently enables power saving. For this purpose, for example, a key switch for selectively setting an energy saving mode is provided on the keyboards 44 and 45, and the energy saving mode is set by depressing the key switch. In the energy saving mode, the effective frequency band is set to 0 to 72 kHz, and the effective word length is set to 18 bits. The specification information data can be achieved by stopping the operation of an unnecessary sub-band by controlling each section from the decoding system controller 54.

A concrete example of the case where a recording signal of a wide band audio data recording medium on which the music of the gamelan of the ethnic instrument shown in FIG. 7 is recorded is reproduced and loss-less decoded will be described. It is to be noted that the processing operations of the sub-band B3 and the sub-band B4 are eliminated. That is, sound reproduction is effected up to, for example, 72 kHz out of the sub-bands totally covering 120 kHz. With this arrangement, the circuit sections for processing the signal data of the sub-band B3 and the sub-band B4 can be removed from the redundancy decompression sections 60-1 to 60-N, the over-sampling sections 70-0 to 70-N and the sub-band combining filter 52. In regard to the number of bits for quantization, by setting the maximum number of bits for quantization to, for example, 18 bits, the operation word lengths of the base band decoding processing section 60-0, the redundancy decompression sections 60-1 to 60-N, the over-sampling sections 70-0 to 70-N and the sub-band combining filter 52 can be reduced for 18-bit use. By virtue of the reductions of processing rate and circuit, the power consumption of the wide band audio signal decoding apparatus 1004 can be remarkably reduced.

Next, the following describes the case where a recording signal is reproduced from the optical disk 300 that is the wide band audio signal recording medium of the present preferred embodiment of the present invention by the prior art AV disk reproducer or player having the SD format, i.e., the apparatus in which the combination of the sampling frequency and the number of bits is limited as follows.

TABLE 2

| | |
|---|---|
| Sampling Frequency | 48 kHz, 96 kHz |
| Number of bits for quantization | 16 bits, 20 bits, 24 bits |
| Number of Channels | 1–8 Channels |

FIG. 15 is a table showing a compatibility of a mutual operation between the prior art AV disk reproducer and the optical disk reproducer of the present preferred embodiment and that between the prior art AV disk and the optical disk of the present preferred embodiment.

An optical disk 300 of the wide band audio signal recording medium is produced in which the specifications of the base band B0 in the first operation mode of the preferred embodiment are set similar to the SD format specifications of the sampling frequency of 48 kHz, the number of bits for quantization of 24 bits and the number of channels of two channels and the signal data of the sub-band B1 to the sub-band B4 are made to be a frame and recorded in the regions of the remaining six channels. By reproducing only the main two channels of the optical disk 300 in the optical disk reproducer 1003, the signal data of the base band B0 can be reproduced even in the optical disk reproducer that copes only with the SD format specifications.

Even the prior art AV disk player or reproducer that copes with only the SD basic format has the possibility that it would be able to achieve a compatibility capable of taking out and reproducing the signal data of the common part in reproducing the signal recorded on the optical disk 300 of the present preferred embodiment.

Furthermore, when playing back an optical disk on which vocal signal data is recorded by the SD basic format in the reproducing apparatus mounted with the wide band audio signal decoding apparatus 1004 of the preferred embodiment of the present invention, the processing section of the base band B0 in the first operation mode or the second operation mode can be commonly used. Furthermore, audio data can be outputted by commonly using the base band decoding processing section 60-0 and the over-sampling section 70-0.

The format and apparatus of the framework of the preferred embodiment of the present invention are constructed so that the considerable maximum performance can be achieved. There is a long distance between the maximum framework and the preparation of the environment that can be achieved for the time being, as well as the achieved specifications of the device and circuit technology. Therefore, it is reasonable for the time being to manufacture and sell the wide band audio signal encoding apparatus 1001, the optical disk 300 that is the wide band audio signal recording medium, the wide band audio signal decoding apparatus 1004 of the present invention by setting parameters based on the practical specifications and improve the specifications by merely changing the parameters while keeping the basic format intact at the point of time when sound recording will be able to be performed in a better environment and further improved devices and circuits will be developed in the future. With this arrangement, the characteristics of the specifications of the wide band audio signal encoding apparatus 1001, the optical disk 300 that is the wide band audio signal recording medium and the wide band audio signal decoding apparatus 1004 can be independently improved, meaning that they are not required to be concurrently changed keeping step with each other. This is a scalable format in which the future specification expandability is incorporated. In other words, the encoded data of the present preferred embodiment is a scalable wide band audio data in terms of the changeability of the parameters, and the wide band audio signal encoding apparatus 1001 and the wide band audio signal decoding apparatus 1004 are the apparatuses that can encode the scalable wide band audio data and thereafter decompress the original wide band audio data through encoding.

Although the redundancy compression sections 30-1 to 30-N and the redundancy decompression sections 60-1 to 60-N use the method of recording and reproducing or transmitting by scaling the scale factor based on the peak level within a predetermined time period in the above-mentioned preferred embodiment, the present invention is not limited to this, and another compressing method of, for example, a table reference type vector quantizing method may be used.

Although the over-sampling frequency is set to 384 kHz in the above-mentioned preferred embodiment, the present invention is not limited to this, and the over-sampling frequency may be changed based on the operations and electric characteristics of the sub-band dividing filter 10 and the sub-band combining filter 52.

Furthermore, the number of input bits and the number of output bits of the wide band audio signal encoding apparatus 1001 and so on are not required to be limited to those of the above-mentioned preferred embodiment. Although the bandwidth of the sub-band is uniform in the above-mentioned preferred embodiment, it should preferably be uniformed in order to simplify the circuit construction.

Furthermore, although the wide band audio signal encoding apparatus 1001 and the wide band audio signal decoding apparatus 1004 are separated from each other in the preferred embodiment of the present invention, it is acceptable to obtain encoded data by constructing the sub-band dividing filter 10, the sub-sampling sections 20-0 to 20-N, the base band encoding processing section 30-0, the redundancy compression sections 30-1 to 30-N and the multiplexer 12 by using a digital signal processor and a memory and making them operate during encoding. Further, decoded wide band audio data can be taken out by changing the operation mode through mode switching of the system controllers 14 and 15 during decoding and constructing the demultiplexer 50, the base band decoding processing section 60-0, the redundancy decompression sections 60-1 to 60-N, the over-sampling sections 70-0 to 70-N and the sub-band combining filter 52 using the above digital signal processor and memory, and making them operate in this fashion. That is, it is acceptable to provide a wide band audio signal encoding and decoding apparatus provided with the wide band audio signal encoding apparatus 1001 and the wide band audio signal decoding apparatus 1004. In this case, almost all the circuits can be commonly used for recording and reproduction when applied to, for example, a recording and reproducing apparatus provided with-the optical disk recorder 1002 and the optical disk reproducer 1003, producing the characteristic effect that the circuit can be simplified.

Although the above-mentioned preferred embodiment employs the linear predictive encoder 11 using the linear predictive encoding method and the linear predictive decoder 51 using the linear predictive decoding method, the present invention is not limited to this. It is acceptable to execute encoding and decoding so as to execute compression by, for example, the Huffman code entropy coding, instead of the linear predictive encoder 11 and the linear predictive decoder 51.

Although the rewritable optical disk 300 is used in the above-mentioned preferred embodiment, the present invention is not limited to this. The present invention can also be applied to disk recording and reproducing apparatuses of other types such as a read-only optical disk and a write once type disk.

Although the optical disk recorder 1002 and the optical disk reproducer 1003 are separated from each other in the present preferred embodiment, it is acceptable to integrate the disk driving mechanism 104 with the disk driving mechanism 205 as one mechanism and integrate the optical disk recorder 1002 with the optical disk reproducer 1003.

Although the optical disk is used as a recording medium in the above preferred embodiment, the present invention is not limited to this. The present invention can also be applied to recording mediums of other types, such as the magneto-optic disk, optical disk, magnetic disk, compact disc, magnetic tape and semiconductor memory.

Although the wide band audio data are recorded and reproduced by means of the optical disk recorder 1002 and the optical disk reproducer 1003 in the above preferred embodiment, the present invention is not limited to this. The present invention may be applied to a transmission system as follows. The system transmits the data encoded by the wide band audio signal encoding apparatus 1001 to a modem or transmitting apparatus of another party by means of a modem or a transmitting apparatus via a communication line of, for example, a telephone line, ISDN (Integrated Services Digital Network), a packet switching network line, an ATM (asynchronous transfer mode) communication line, a frame relay communication line. On the other hand, the modem or the transmitting apparatus of the other party receives the encoded data of the transmitted wide band audio data and decodes the received encoded data into the original wide band audio data by the wide band audio signal decoding apparatus 1004.

Although the above-mentioned preferred embodiment is provided with the demultiplexer 42 and the multiplexer 46, the present invention is not limited to this, and is not required to be provided with them.

Although the above-mentioned preferred embodiment is provided with the encoding dither generator 13 and the adder 43, the present invention is not limited to this, and it is not required to be provided with them.

Although the above preferred embodiment is provided with the base band and the predetermined natural number N of sub-bands, it is acceptable to regard the base band as one sub-band and provide a total of (N+1) sub-bands in terms of name for convenience sake.

The bandwidth of the base band B0 may be set to one bandwidth in the range of 10 kHz to 48 kHz. Furthermore, the sub-sampling frequency of the base band B0 may be set approximately to 32 kHz, 44.1 kHz, 48 kHz, 88.2 kHz or 96 kHz. Furthermore, the sub-sampling frequencies in the sub-sampling sections 20-0 to 20-N may each be set approximately to 32 kHz, 44.1 kHz, 48 kHz, 88.2 kHz or 96 kHz.

The sub-sampling frequency of the base band B0 and the sub-sampling frequencies of the other sub-bands B1 to BN may be set to be equal to each other. Furthermore, the scale factors of the above-mentioned N redundancy compression sections 30-1 to 30-N should preferably be fixed at least in a unit of program of the signal to be collected. The base band encoding processing section 30-0 should preferably encode the signal data of the base band by the linear coding PCM system having a number of bits for quantization from 16 bits to 24 bits. Furthermore, the noise floor information data includes at least one of following:

(a) information relevant to the background noise of the recording studio and the noise characteristics of the recording microphone and the microphone amplifier;

(b) information relevant to the sampling frequency and the word length of the inputted wide band audio data; and (c) information relevant to the noise characteristics of one audio apparatus of the mixing console and the effector when the audio apparatus is used.

The encoding system controller 14 should preferably determine the number of bits for quantization of each sub-band so that a level, which is a predetermined decibel value lower than the decibel value of the noise floor determined based on the inputted wide band audio data in each sub-band, is set as the minimum level of code quantization.

Furthermore, the base band B0 and at least one of the sub-bands may be allocated to the corresponding respective channels of multi-channel of a further apparatus.

As described above, according to the present preferred embodiment of the present invention, the number of bits is reduced by changing the noise floor and the compression effect of the redundant run length is effected by determining the scale factor by means of the dividing method of a plurality of sub-bands and the linear PCM coding method based on the inputted noise floor information data and signal band information data. With this arrangement, while securing the capacity for encoding a ultrahigh frequency region high-fidelity signal by automatically widening the band to 120 kHz and allocating a maximum of 24 bits if wide band high-output data extending up to the maximum band is inputted, the effect of effectively loss-less encoding the sound in the natural world can be obtained on the other hand. The encoded data can be recorded on the optical disk 300, or the wide band audio signal recording medium. By reproducing the recording signal from the optical disk 300 on which the recording signal of the encoded data is recorded, the wide band audio signal decoding apparatus 1004 can decode the data into the original wide band audio data based on the noise floor information data and the redundant run length information data included in the encoded signal of the reproduced reproduction signal according to the time-division multiplexing method.

Furthermore, by changing the encoding parameters and the decoding parameters according to the technical progress and development, the recording signal of the encoded data can be recorded on the optical disk 300, or the wide band audio signal recording medium. In this case, by setting the operation specifications of the wide band audio signal decoding apparatus 1004 based on the signal information data recorded on the optical disk 300, the decoding apparatus 1004 can be operated while being interlocked with the wide band audio signal encoding apparatus 1001. Instead, by restrictively changing the specifications of the reproducing process according to the required band and the number of bits of the optical disk reproducer 1003, the characteristic effect of providing a wide band audio signal decoding apparatus 1004 having advantages in terms of power saving and economical performance is produced. Besides the above-mentioned effects, there are concrete operations and effects as follows.

(a) Both the characteristics of a wide dynamic range of not lower than 140 dB and a wide band of a Nyquist frequency of 120 kHz can be concurrently achieved at a low bit rate of 3.12 Mbps per channel. In other words, the impurity of sound attributed to the degradation in distortion factor at the minute level is eliminated, so that the original sound reproduction of the ultrahigh frequency region signal ranging from 20 kHz to 120 kHz can be achieved. This enables the achievement of recording and reproduction capable of reproducing an extremely transparent natural sound extending to an ultrahigh frequency region, getting rid of the limited space of the sampling frequency of 44.1 kHz and the number of bits for quantization of 16 bits as observed in the prior art compact-disc (CD) and the like in addition to a recording medium capable of recording the above wide band audio data and a reproduction sound field.

(b) Since the energy of the ultrahigh frequency band in the music signal is small, the loss-less coding can be achieved with the accuracy of 24 bits for quantization by compressing the redundant run length when the signal is comprised of only the ultrahigh frequency components or mainly comprised of the ultrahigh frequency components. This can suppress an increase in average bit rate.

(c) More preferably, by compressing the signal data of a predetermined sub-band by the entropy coding, $\Delta$-$\Sigma$ modulation or the combination of both, a synergistic effect with the run-length compression can be obtained, so that the effect of reducing the average bit rate can be further developed.

(d) By virtue of the scalable coding by which the required bit rate is determined by the product of the reproduction band and the dynamic range, the devices and circuits of the highest performance that are currently achievable can execute encoding at a low bit rate, and the bit rate will be able to be arbitrarily changed and adjusted according to the development of the performance in future in order to cope with the development.

(e) Reproduction can be achieved even by a portable type wide band audio signal decoding apparatus of simplified specifications intended for power saving by means of a common recording medium.

(f) Since the base band can be made similar to and common to the conventional format, compatibility with the prior art format can be obtained in the frequency band of the base band. By using this as a format for bridging, the signal data of the common part of a new media can be reproduced even by the prior art apparatus or DVD video player.

Although the present invention has been sufficiently described in connection with the preferred embodiments thereof with reference to the accompanying drawings, a variety of modifications and corrections are apparent to the persons skilled in the art. It should be understood that such modifications and corrections are included in the scope of the present invention unless they depart from the scope of the present invention defined by the appended claims.

INDUSTRIAL APPLICABILITY

The present invention provides a wide band audio signal encoding apparatus, a wide band audio signal decoding apparatus, a wide band audio signal encoding and decoding apparatus provided with the wide band audio signal encoding apparatus and the wide band audio signal decoding apparatus, and a wide band audio signal recording medium.

The above-mentioned wide band audio signal encoding apparatus comprises a sub-band dividing filter which divides inputted wide band audio data into signal data of a predetermined natural number N of sub-bands, and then, outputs the resulting signal data, N sub-sampling means for sub-sampling the signal data of the N sub-bands outputted from the sub-band dividing filter with respective predetermined numbers of bits for quantization, respectively, and outputting the resulting data an encoding system controlling means for determining the numbers of bits for quantization of the N sub-sampling means based on inputted noise floor information and setting the determined numbers of bits for quantization to the respective N sub-sampling means, respectively, and a multiplexer which multiplexes the signal data of the N sub-bands outputted from the N sub-sampling means, and then, outputs the multiplexed encoded data.

Further, the above-mentioned wide band audio signal decoding apparatus comprises a demultiplexer which demultiplexes signal data of a natural number N of sub-bands and noise floor information from inputted encoded data, N redundancy decompressing means for decompressing signal data of the N sub-bands, respectively, by executing a redundancy decompression process on the signal data of the N sub-bands based on the noise floor information, and outputting the resulting data, N over-sampling means for executing an over-sampling process on the signal data of N sub-bands outputted from the N redundancy decompressing means, respectively, and outputting the processed signal data of the N sub-bands, and a sub-band combining filter which combines the signal data of the N sub-bands outputted from the N over-sampling means, and then, outputs the combined wide band audio data.

Furthermore, the wide band audio signal recording medium is a wide band audio signal recording medium, in which wide band audio data is divided into signal data of a predetermined natural number N of sub-bands. The number of bits for quantization for sub-sampling is determined based on noise floor information of the wide band audio data. The signal data of the N sub-bands are each sub-sampled by the determined number of bits for quantization. Then, encoded data obtained by multiplexing the signal data of the sub-sampled N sub-bands is recorded in the wide band audio signal recording medium.

Therefore, both the characteristics of the extremely wide dynamic range and the wide band as compared with those of the prior art can be concurrently achieved at a relatively low bit rate per channel. In other words, the impurity of sound attributed to the degradation of the distortion factor at the minute level is eliminated, and original sound reproduction of an ultrahigh frequency region signal ranging up to, for example, 120 kHz can be achieved. This allows for the achievement of recording and reproduction capable of reproducing an extremely transparent natural sound extending to an ultrahigh frequency region, getting rid of the limited space of the prior art compact disc (CD) and the like, and a recording medium capable of recording the above-mentioned wide band audio data and a reproduction sound field.

I claim:

1. A wide band audio signal encoding apparatus comprising:
   a sub-band dividing filter being operable to divide wide band audio data into signal data of a natural number of N sub-bands, and being operable to output the signal data;
   N sub-sampling means for sub-sampling the signal data of the N sub-bands outputted from said sub-band dividing filter with respective numbers of bits for quantization, respectively, and outputting the resulting data;
   encoding system controlling means for determining the respective numbers of bits for quantization for said N sub-sampling means based on noise floor information and setting the respective numbers of bits for quantization for said N sub-sampling means, respectively; and
   a multiplexer being operable to multiplex the signal data of the N sub-bands outputted from said N sub-sampling means, and being operable to output the multiplexed encoded data,
   wherein said encoding system controlling means determines the number of bits for quantization of each of the N sub-bands so that a level, which is a decibel value lower than a decibel value of a noise floor included in the noise floor information, is set as a minimum level of code quantization in each of the N sub-bands, and a bandwidth of a base band, the base band being a lowest band of the N sub-bands, is set to a bandwidth of 10 kHz to 48 kHz.

2. A wide band audio signal encoding apparatus comprising:
   encoding system controlling means for determining a bandwidth of division and a number N of division of bands of wide band audio data so that only a signal band included in signal band information is a band to be encoded, based on signal information including the signal band information of the wide band audio data;
   a sub-band dividing filter being operable to divide the wide band audio data into signal data of a natural number of N sub-bands having the bandwidth of division and the number N of division determined by said encoding system controlling means, and being operable to output the resulting data;
   N sub-sampling means for sub-sampling the signal data of the N sub-bands outputted from said sub-band dividing filter, respectively, and outputting the resulting data;
   N redundancy compressing means for determining a scale factor by detecting a signal data peak level within a time period of the signal data of at least one sub-band of the N sub-bands outputted from said N sub-sampling means, executing an eliminating process for eliminating a high-order redundant run length for the signal data of the N sub-bands based on the scale factor, and outputting the eliminating processed signal data of the N sub-bands; and
   a multiplexer for multiplexing the scale factor determined by said N redundancy compressing means with the eliminating processed signal data of the N sub-bands outputted from said N redundancy compressing means, and outputting the multiplexed encoded data,
   wherein the signal data of a base band, the base band being a lowest band of the N sub-bands, is not subjected to the eliminating process executed by said N redundancy compressing means and instead, is encoded by a linear coding PCM system having a number of bits for quantization in a range of 16 bits to 24 bits.

3. A wide band audio signal encoding apparatus as claimed in claim 2, wherein a bandwidth of a base band, the base band being a lowest band of the N sub-bands, is set to a bandwidth of 10 kHz to 48 kHz.

4. A wide band audio signal encoding apparatus comprising:
   encoding system controlling means for determining a bandwidth of division and a number N of division of bands of wide band audio data so that only a signal band included in signal band information is a band to be encoded, based on signal information including the signal band information of the wide band audio data;
   a sub-band dividing filter being operable to divide the wide band audio data into signal data of a natural number of N sub-bands having the bandwidth of division and the number N of division determined by said encoding system controlling means, and being operable to output the resulting data;
   N sub-sampling means for sub-sampling the signal data of the N sub-bands outputted from said sub-band dividing filter, respectively, and outputting the resulting data;
   N redundancy compressing means for determining a scale factor by detecting a signal data peak level within a time period of the signal data of at least one sub-band of the N sub-bands outputted from said N sub-sampling means, executing an eliminating process for eliminating a high-order redundant run length for the signal data of the N sub-bands based on the scale factor, and outputting the eliminating processed signal data of the N sub-bands; and
   a multiplexer for multiplexing the scale factor determined by said N redundancy compressing means with the eliminating processed signal data of the N sub-bands outputted from said N redundancy compressing means, and outputting the multiplexed encoded data,
   wherein a bandwidth of a base band, the base band being a lowest band of the N sub-bands, is set to a bandwidth of 10 kHz to 48 kHz.

5. A wide band audio signal encoding apparatus comprising:

encoding system controlling means for determining a bandwidth of division and a number N of division of bands of wide band audio data so that only a signal band included in signal band information is a band to be encoded, based on signal information including the signal band information of the wide band audio data;

a sub-band dividing filter being operable to divide the wide band audio data into signal data of a natural number N of sub-bands having the bandwidth of division and the number N of division determined by said encoding system controlling means, and being operable to output the resulting data;

N sub-sampling means for sub-sampling the signal data of the N sub-bands outputted from said sub-band dividing filter, respectively, and outputting the resulting data;

redundancy compressing means for compressing the signal data by executing a reversible redundancy compressing process on the signal data of at least one sub-band among the signal data of the N sub-bands outputted from said N sub-sampling means, and being operable to output the compressing processed signal data; and a multiplexer being operable to multiplex the signal data of the N sub-bands outputted from said sub-sampling means and said redundancy compressing means, and outputting the multiplexed encoded data, wherein a bandwidth of a base band, the base band being a lowest band of the N sub-bands, is set to a bandwidth of 10 kHz to 48 kHz.

6. A wide band audio signal encoding apparatus comprising:

encoding system controlling means for determining a bandwidth of division and a number N of division of bands of wide band audio data so that only a signal band included in signal band information is a band to be encoded, based on signal information including the signal band information of the wide band audio data;

a sub-band dividing filter being operable to divide the wide band audio data into signal data of a natural number N of sub-bands having the bandwidth of division and the number N of division determined by said encoding system controlling means, and being operable to output the resulting data;

N sub-sampling means for sub-sampling the signal data of the N sub-bands outputted from said sub-band dividing filter, respectively, and outputting the resulting data;

redundancy compressing means for compressing the signal data by executing a reversible redundancy compressing process on the signal data of at least one sub-band among the signal data of the N sub-bands outputted from said N sub-sampling means, and being operable to output the compressing processed signal data; and a multiplexer being operable to multiplex the signal data of the N sub-bands outputted from said sub-sampling means and said redundancy compressing means, and outputting the multiplexed encoded data, wherein the signal data of a base band, the base band being a lowest band of the N sub-bands, is not subjected to the compressing process executed by said redundancy compressing means and instead, is encoded by a linear coding PCM system having a number bits for quantization in a range of 16 bits to 24 bits.

7. A wide band audio signal encoding apparatus comprising:

encoding system controlling means for determining a bandwidth of division and a number N of division of bands of wide band audio data based on signal information including noise floor information and signal band information of the wide band audio data, and determining a number of bits for quantization in N sub-sampling means based on the noise floor information, respectively;

a sub-band dividing filter being operable to divide the wide band audio data into signal data of N sub-bands having the bandwidth of division and the number N of division determined by said encoding system controlling means, and being operable to output the resulting data;

said N sub-sampling means for sub-sampling the signal data of the N sub-bands outputted from said sub-band dividing filter with the number of bits for quantization determined by said encoding system controlling means, respectively, and outputting the resulting data; and a multiplexer being operable to multiplex the signal data of the N sub-bands outputted from said N sub-sampling means with the signal information, and being operable to output the multiplexed encoded data, wherein said encoding system controlling means determines the number of bits for quantization of each of the N sub-bands so that a level, which is a decibel value lower than a decibel value of a noise floor included in the noise floor information, is set to a minimum level of code quantization in each of the N sub-bands, and a bandwidth of a base band, the base band being a lowest band of the N sub-bands, is set to a bandwidth of 10 kHz to 48 kHz.

8. A wide band audio signal encoding apparatus comprising:

encoding system controlling means for determining a bandwidth of division and a number N of division of bands of wide band audio data based on signal information including noise floor information and signal band information of the wide band audio data, and determining a number of bits for quantization of N sub-sampling means based on the noise floor information, respectively;

a sub-band dividing filter being operable to divide the wide band audio data into signal data of N sub-bands having the bandwidth of division and the number N of division determined by said encoding system controlling means, and being operable to output the resulting data;

said N sub-sampling means for sub-sampling the signal data of the N sub-bands outputted from said sub-band dividing filter with the number of bits for quantization determined by said encoding system controlling means, respectively, and outputting the resulting data;

N redundancy compressing means for compressing signal data by executing a reversible redundancy compressing process on the signal data of the N sub-bands outputted from said N sub-sampling means, and outputting the compressing processed signal data; and a multiplexer being operable to multiplex the signal data of the N sub-bands outputted from said N redundancy compressing means and the signal information, and being operable to output the multiplexed encoded data, wherein said encoding system controlling means determines the number of bits for quantization of each of the N sub-bands so that a level, which is a decibel value lower than a decibel value of a noise floor included in the noise floor information, is set as a minimum level of code quantization in each of the N sub-bands, and a bandwidth of a base band, the base band being a lowest band of the N sub-bands, is set to a bandwidth of 10 kHz to 48 kHz.

9. A wide band audio signal encoding apparatus comprising:

encoding system controlling means for determining a bandwidth of division and a number N of division of bands of wide band audio data based on signal information including noise floor information and signal band information of the wide band audio data, and determining a number of bits for quantization of N sub-sampling means based on the noise floor information, respectively;

a sub-band dividing filter being operable to divide the wide band audio data into signal data of N sub-bands having the bandwidth of division and the number N of division determined by said encoding system controlling means, and being operable to output the resulting data;

said N sub-sampling means for sub-sampling the signal data of the N sub-bands outputted from said sub-band dividing filter with the number of bits for quantization determined by said encoding system controlling means, respectively, and outputting the resulting data;

N redundancy compressing means for compressing signal data by executing a reversible redundancy compressing process on the signal data of the N sub-bands outputted from said N sub-sampling means, and outputting the compressing processed signal data; and a multiplexer being operable to multiplex the signal data of the N sub-bands outputted from said N redundancy compressing means and the signal information, and being operable to output the multiplexed encoded data, wherein said encoding system controlling means determines the number of bits for quantization of each of the N sub-bands so that a level, which is a decibel value lower than a decibel value of a noise floor included in the noise floor information, is set as a minimum level of code quantization in each of the N sub-bands, and the signal data of a base band, the base band being a lowest band of the N sub-bands, is not subjected to the compressing process executed by said redundancy compressing means and instead, is encoded by a linear coding PCM system having a number of bits for quantization in a range of 16 bits to 24 bits.

10. A wide band audio signal encoding apparatus comprising:

encoding system controlling means for determining a bandwidth of division and a number N of division of bands of wide band audio data so that only a signal band included in signal band information becomes a band to be encoded, based on signal information including signal band information of the wide band audio data;

a sub-band dividing filter being operable to divide the wide band audio data into signal data of N sub-bands having the bandwidth of division and the number N of division determined by said encoding system controlling means, and outputting the resulting data;

N sub-sampling means for sub-sampling the signal data of the N sub-bands outputted from said sub-band dividing filter, respectively, and outputting the resulting data;

redundancy compressing means for executing a reversible Δ-Σ modulating process on the signal data of at least one of the N sub-bands outputted from said N sub-sampling means, and outputting the modulating processed signal data; and a multiplexer being operable to multiplex the signal data of the N sub-bands outputted from said N sub-sampling means and said redundancy compressing means, and being operable to output the multiplexed encoded data, wherein a bandwidth of a base band, the base band being a lowest band of the N sub-bands, is set to a bandwidth of 10 kHz to 48 kHz.

11. A wide band audio signal encoding apparatus comprising:

encoding system controlling means for determining a bandwidth of division and a number N of division of bands of wide band audio data so that only a signal band included in signal band information becomes a band to be encoded, based on signal information including signal band information of the wide band audio data;

a sub-band dividing filter being operable to divide the wide band audio data into signal data of N sub-bands having the bandwidth of division and the number N of division determined by said encoding system controlling means, and outputting the resulting data;

N sub-sampling means for sub-sampling the signal data of the N sub-bands outputted from said sub-band dividing filter, respectively, and outputting the resulting data;

redundancy compressing means for executing a reversible Δ-Σ modulating process on the signal data of at least one of the N sub-bands outputted from said N sub-sampling means, and outputting the modulation processed signal data; and a multiplexer being operable to multiplex the signal data of the N sub-bands outputted from said N sub-sampling means and said redundancy compressing means, and being operable to output the multiplexed encoded data, wherein the signal data of a base band, the base band being a lowest band of the N sub-bands, is not subjected to the modulating process executed by said redundancy compressing means and instead, is encoded by a linear coding PCM system having a number of bits for quantization in a range of 16 bits to 24 bits.

* * * * *

UNITED STATES PATENT AND TRADEMARK OFFICE
CERTIFICATE OF CORRECTION

PATENT NO.     : 6,449,596 B1
DATED          : September 10, 2002
INVENTOR(S)    : Naoki Ejima It is certified that error appears in the above-identified patent and that said Letters Patent is hereby corrected as shown below:

<u>Title page,</u>
Item [30], Foreign Application Priority Data, should read as follows:

--     Feb. 8, 1996    (JP)     …………………………..8-22291
       Mar. 27, 1996   (JP)     …………………………...8-72693 --

Item [57], ABSTRACT,
Line 15, replace the word "he" with -- the --.

Signed and Sealed this

Fourth Day of February, 2003

JAMES E. ROGAN
*Director of the United States Patent and Trademark Office*